(12) United States Patent
Sabourin

(10) Patent No.: US 10,705,750 B2
(45) Date of Patent: Jul. 7, 2020

(54) DATA STORAGE SYSTEM AND METHOD FOR PERFORMING SAME

(71) Applicant: INFORMATIQUE HOLISTEC INC., LaSalle, Québec (CA)

(72) Inventor: Guy Sabourin, LaSalle (CA)

(73) Assignee: INFORMATIQUE HOLISTEC INC., LaSalle, Québec (CA)

( * ) Notice: Subject to any disclaimer, the term of this patent is extended or adjusted under 35 U.S.C. 154(b) by 21 days.

(21) Appl. No.: 16/307,699

(22) PCT Filed: Jun. 9, 2017

(86) PCT No.: PCT/CA2017/050708
§ 371 (c)(1),
(2) Date: Dec. 6, 2018

(87) PCT Pub. No.: WO2017/210798
PCT Pub. Date: Dec. 14, 2017

(65) Prior Publication Data
US 2019/0303031 A1 Oct. 3, 2019

Related U.S. Application Data

(60) Provisional application No. 62/347,883, filed on Jun. 9, 2016.

(51) Int. Cl.
*G06F 12/00* (2006.01)
*G06F 13/00* (2006.01)
(Continued)

(52) U.S. Cl.
CPC .......... *G06F 3/0644* (2013.01); *G06F 3/0604* (2013.01); *G06F 3/0673* (2013.01);
(Continued)

(58) Field of Classification Search
CPC ..................................................... G06F 3/0604
See application file for complete search history.

(56) References Cited

U.S. PATENT DOCUMENTS

| 6,928,526 B1 | 8/2005 | Zhu et al. |
| 8,495,099 B2 | 7/2013 | Maim |

(Continued)

OTHER PUBLICATIONS

International Searching Authority (ISA), International Search Report and Written Opinion for International Application No. PCT/CA2017/050708, dated Sep. 18, 2017, 9 pages, Canadian Intellectual Property Office, Canada.

(Continued)

*Primary Examiner* — Sean D Rossiter
(74) *Attorney, Agent, or Firm* — Alston & Bird LLP

(57) ABSTRACT

A computer-implemented method for performing data storage. The method comprises the steps of: receiving data to be stored from a data source; segmenting the data into immutable core objects each being written into a collection and being assigned a unique object ID; grouping the immutable objects into blobs each including at least one of the objects and being assigned a unique blob ID derived from the object ID of the at least one of the objects included therein, with the last blob of the collection being identifiable as such; defining a state of the collection by linking at least one subset of the core objects of the collection to one another with a last object of each subset being the object head of the corresponding subset and storing identification information of the head object; and storing each one of the blobs onto at least one backend.

20 Claims, 13 Drawing Sheets

(51) Int. Cl.
*G06F 3/06* (2006.01)
*G06F 21/60* (2013.01)
*G06F 5/00* (2006.01)
*G06F 16/00* (2019.01)
*G06F 16/21* (2019.01)
*G06F 16/22* (2019.01)

(52) U.S. Cl.
CPC ............. *G06F 5/00* (2013.01); *G06F 16/00* (2019.01); *G06F 16/214* (2019.01); *G06F 16/2219* (2019.01); *G06F 21/602* (2013.01); *G06F 2221/2107* (2013.01)

(56) References Cited

U.S. PATENT DOCUMENTS

| | | |
|---|---|---|
| 8,510,344 B1 | 8/2013 | Briggs et al. |
| 8,615,485 B2 | 12/2013 | Yonatan et al. |
| 8,756,261 B2 | 6/2014 | Pfeifle et al. |
| 8,760,956 B1 | 6/2014 | Zhong et al. |
| 8,918,363 B2 | 12/2014 | Naidu et al. |
| 9,268,806 B1 | 2/2016 | Kesselmen |
| 9,367,557 B1 | 6/2016 | Lin et al. |
| 2008/0168135 A1 | 7/2008 | Redlich et al. |
| 2010/0106695 A1 | 4/2010 | Calder et al. |
| 2011/0196900 A1 | 8/2011 | Drobychev et al. |
| 2014/0244599 A1 | 8/2014 | Zhang et al. |
| 2015/0026143 A1 | 1/2015 | Patel et al. |
| 2015/0212900 A1 | 7/2015 | Hayasaka et al. |
| 2016/0108462 A1 | 4/2016 | Sinha |
| 2016/0110261 A1 | 4/2016 | Parab et al. |
| 2017/0034217 A1 | 2/2017 | Anton et al. |
| 2017/0123935 A1 | 5/2017 | Pandit et al. |
| 2017/0364450 A1* | 12/2017 | Struttmann ............ H04L 63/123 |
| 2017/0364698 A1* | 12/2017 | Goldfarb .............. G06F 21/6218 |
| 2017/0364699 A1* | 12/2017 | Goldfarb ................ H04L 9/3239 |
| 2017/0364700 A1* | 12/2017 | Goldfarb ................. G06F 21/64 |
| 2017/0364701 A1* | 12/2017 | Struttmann .............. G06F 21/78 |
| 2017/0366353 A1* | 12/2017 | Struttmann .............. G06F 21/64 |
| 2018/0205552 A1* | 7/2018 | Struttmann ........... H04L 9/3239 |
| 2018/0307857 A1* | 10/2018 | Beecham .............. H04L 9/3239 |
| 2019/0288850 A1* | 9/2019 | Beecham ................. G06F 21/64 |
| 2019/0318117 A1* | 10/2019 | Beecham ............ G06F 16/9024 |

OTHER PUBLICATIONS

Informatique Holistec Inc., Applicant's Response to ISA's Sep. 18, 2017 Written Opinion for International Application No. PCT/CA2017/050708, dated Apr. 6, 2018, 8 pages, Robic, Canada.

International Preliminary Examining Authority, International Preliminary Report on Patentability (Chapter II) for International Application No. PCT/CA2017/050708, dated Oct. 9, 2018, 4 pages, Canadian Intellectual Property Office, Canada.

* cited by examiner

DATA STORAGE SYSTEM AND METHOD FOR PERFORMING SAME

CROSS REFERENCE TO RELATED APPLICATIONS

This application is a National Stage Application, filed under 35 U.S.C. 371, of International Application No. PCT/CA2017/050708, filed Jun. 9, 2017, which claims the benefit under 35 U.S.C. § 119(e) of U.S. provisional patent application No. 62/347,883, which was filed on Jun. 9, 2016. The contents of both are herein incorporated by reference in their entirety.

TECHNICAL FIELD OF THE INVENTION

The present invention relates to the field of data storage. More particularly, it relates to a system for performing data storage and to a method for performing the same.

BACKGROUND

It is known in the art to use cloud data storage technologies in order to store data on remote, abstract locations, and subsequently retrieve the data, using communication devices connected to a network. In order to proceed to the storage of data, clients typically connect to a cloud storage provider with the communication device, through an application, plugin, API, Web browser, or the like, which stores the data (such as regular filesystem files (e.g. NTFS, EXT3/4, or the like), database records, objects, or the like) on its own servers or datacenters, using known storage technologies (such as mirroring, SAN, RAID or the like) to provide resiliency. When using cloud data storage technologies, storage and retrieval of the data is fully handled by the cloud storage provider, such that users are not concerned about material and security aspects of data storage, such as, for example and without being limitative, the hardware equipment, physical location, precise security measures or other requirements of the servers or datacenters where the data is physically stored.

Known cloud data storage technologies however tend to suffer from several drawbacks. For example, given that client data is stored directly on the infrastructure of the cloud storage provider, the cloud storage provider commonly has access to the data. Hence, clients must trust the security practices, technology and personnel of the cloud service provider with regards to the confidentiality of the stored data. In some cases, it is possible to use encryption to improve security, but even then, the cloud storage provider is generally required to access at least some information. For example, in some instances, the cloud storage provider is required to have access to the encryption key to encrypt and decrypt the data. Even in cases where the provider theoretically never has access to the encryption/decryption keys protecting the client data, it is still required to have access to some unencrypted metadata (e.g. file names, directory structures, modification dates, etc.), which can include important privileged information (e.g. client list, nature of a contract, projects being worked on, etc.), to locate and access the data upon request. Therefore, even when encryption is used, the client must have a certain level of trust in the security practices of the cloud storage provider.

Moreover, given the particularities of each cloud data storage provider, it is not convenient for clients to switch from one cloud data storage provider to another or to distribute their data over multiple cloud storage data providers. For example, in order to distribute data over multiple cloud data storage providers, it is generally required for a client to manually partition the data along some known boundaries (e.g. subdirectories, database key ranges, etc.) and assign specific portions to individual providers. Moreover, if a client subsequently wants to switch between cloud data storage providers (for the entirety or a portion of the data), the client is generally required to manually copy the corresponding data from one provider to the other and ensure that all users accessing that data now use the new provider. During such a copy of the data, updates must be suspended or directed to only one of the two providers to ensure integrity. Moving data from one provider to another can also cause failures and loss of metadata as a result of varying services and restrictions of the specific cloud data storage provider.

One skilled in the art will understand that it is possible to use aggregators (i.e. agents which operate between the client and the cloud data storage providers) to alleviate some of the above-mentioned shortcomings. However, the use of aggregators once again raises confidentiality issues, given that the aggregators generally require access to the data and therefore need to be trusted on the same level as a cloud storage provider would be. In addition, in such a case, performance of the cloud base storage services depends on the aggregator's services and any service failure or performance problem of the aggregator will result in issues for all of the cloud base storage services.

It will be understood that many of the above-mentioned issues also apply to local data storage or network data storage. For example, when a user wishes to switch from a personal hard disk to another, the user is required to copy all the data from one disk to the other while no updates are being performed. If multiples disks are used, the user is required to manually decide which files or directories should be stored on which disk. In addition, Filesystems support which varies between platforms often can cause failures or result in a loss of metadata when moving/copying data from different filesystems.

In view of the above, there is a need for an improved system and method for structuring and storing data in a distributed environment, which would be able to overcome or at least minimize some of the above-discussed prior art concerns.

BRIEF SUMMARY OF THE INVENTION

According to a first general aspect, there is provided a computer-implemented method for performing data storage. The method comprises the steps of: receiving data to be stored from a data source; segmenting the data into immutable core objects, each one of the core objects being written into a collection and being assigned a unique object ID; grouping the immutable objects into blobs each including at least one of the objects, each one of the blobs being assigned a unique blob ID derived from the object ID of the at least one of the objects included therein, with the last blob of the collection being identifiable as such; defining a state of the collection by linking at least one subset of the core objects of the collection to one another with a last object of each one of the at least one subset being the object head of the corresponding subset and storing identification information of the head object; and storing each one of the blobs onto at least one backend.

In an embodiment, the step of storing identification information of the head object comprises storing identification information of the head object in the last blob of the collection.

In an embodiment, the method further comprises the step of selectively retrieving corresponding blobs from one of the at least one backend upon request of the stored data.

In an embodiment, each one of the core objects has an object type and the step of maintaining the state of the collection by linking at least one subset of the core objects of the collection to one another, with the last object of each one of the at least one subset being the object head, comprises linking active objects of each object type with the last object of each object type being the head object for the corresponding object type.

In an embodiment, the step of storing each one of the blobs onto at least one backend includes storing the blobs onto distributed backends.

In an embodiment, the method further comprises the step of encrypting the blobs prior to the step of storing the blobs onto the at least one backend.

In an embodiment, the method further comprises the steps of encrypting the blobs prior to the step of storing the blobs onto the at least one backend and decrypting the blobs subsequently to the step of retrieving corresponding blobs from one of the at least one backend.

In an embodiment, the method further comprises the step of compressing the blobs prior to the step of encrypting the blobs.

In an embodiment, the method further comprises the step of decompressing the blobs subsequently to the step of decrypting the blobs.

In an embodiment, the method further comprises the step of forking the collection by introducing multiple last blobs being identifiable as the last blob of each forked collection.

In an embodiment, the method further comprises the step of merging a forked collection into one of a collection and another fork of a collection.

According to another general aspect, there is also provided, a computer readable memory having recorded thereon statements and instructions for execution by a computer to carry out the above-described method.

According to another general aspect, there is also provided, a data storage system comprising a core engine module configured to receive data to be stored, store the data onto at least one backend, and retrieve the data from the at least one backend. The core engine module generates and manages at least one collection comprising: core objects each including data to be stored, blobs each including at least one of the objects and the at least one of backend. Each one of the core objects is immutable and is assigned a unique object ID. At least one subset of the core objects are linked to one another with a last object of each one of the at least one subset being the object head of the corresponding subset. Each one of the blobs is assigned a unique blob ID derived from the object ID of the at least one of the objects included. The last blob of the collection is identifiable as such and includes identification information of the head object of each one of the at least one subset. The at least one backend stores the blobs thereon and allows the blobs to be retrieved using the corresponding blob ID.

In an embodiment, the core engine module comprises a core API module configured to open collections and read, write and delete core objects, a collection manager module configured to generate and manage the core objects, and a blob manager module configured to generate and manage the blobs.

In an embodiment, the core engine module further comprises an encryptor module encrypting the blobs prior to storage onto the at least one backends and decrypting the blobs subsequently to retrieval from the at least one backends.

In an embodiment, the core engine module further comprises a compressor module compressing the blobs prior to encryption by the encryptor module and decompressing the blobs subsequently to decryption by the encryptor module.

In an embodiment, link data representative of the links between the core objects of each one of the at least one subset of the core objects is stored in at least a portion of the core objects.

In an embodiment, the unique object ID of each one of the core objects is assigned sequentially.

In an embodiment, the unique blob ID of each one of the blobs corresponds to the object ID of the first core object of the blob.

In an embodiment, each one of the core objects further comprises one of an object alias and a virtual object ID.

In an embodiment, the data storage system further comprises an index engine performing indexing services to facilitate the organization and location of data stored in a collection.

In an embodiment, the at least one backend of each collection comprises multiple distributed backends to provide distributed storage of the blobs.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which.

DETAILED DESCRIPTION

Figure 1:
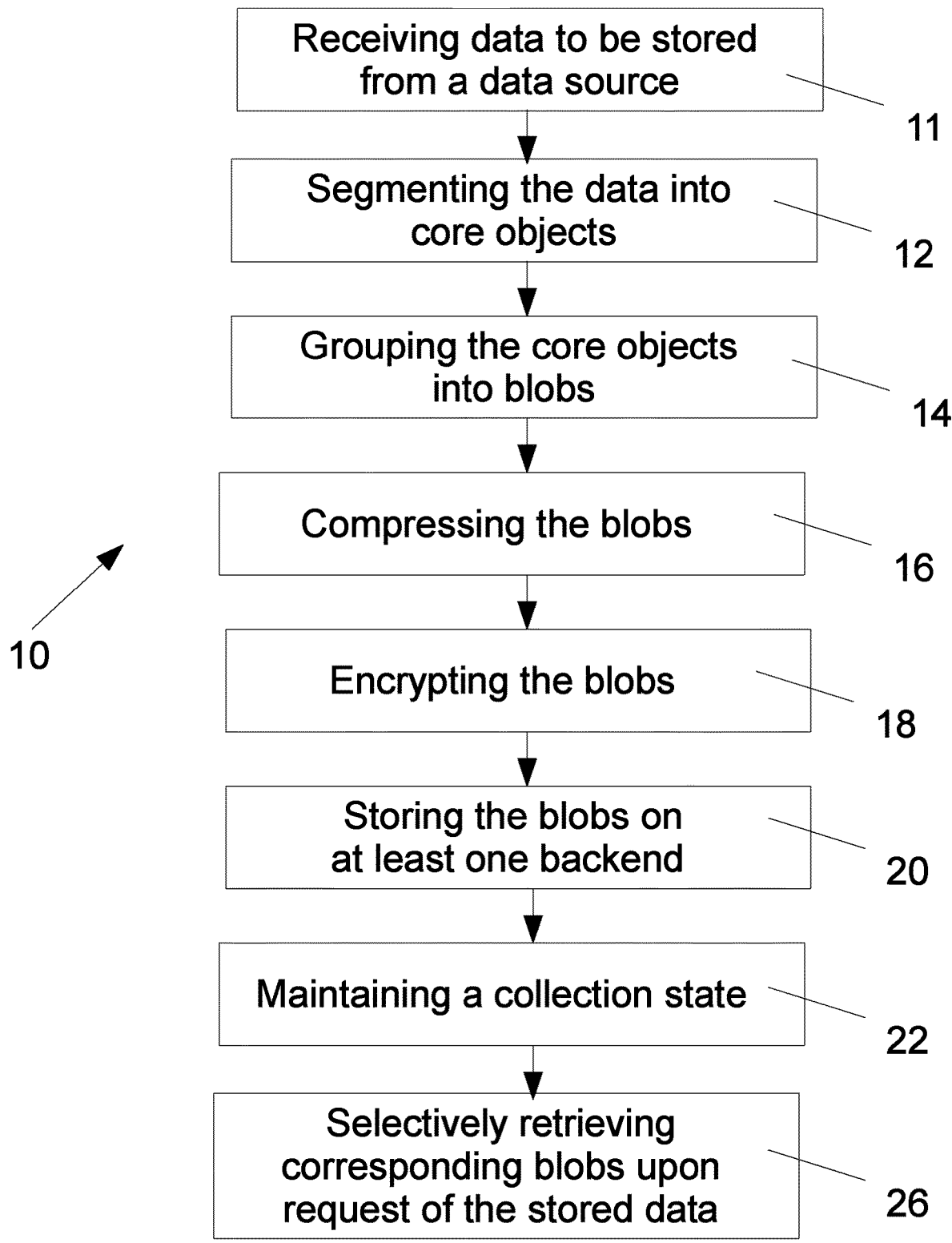
FIGS. 1, 1a and 1b are flowchart representations of the steps of a computer implemented method for performing data storage, according to an embodiment.
Figure 1A:
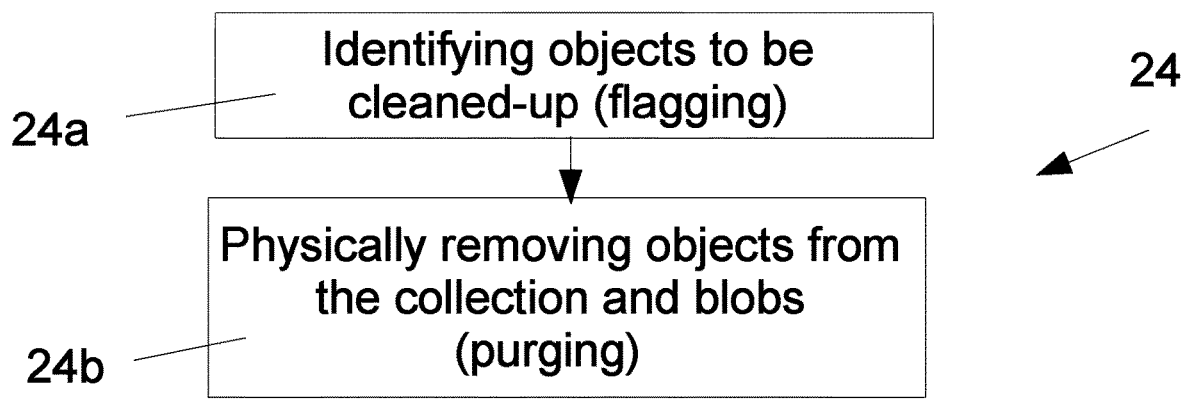
Figure 1B:
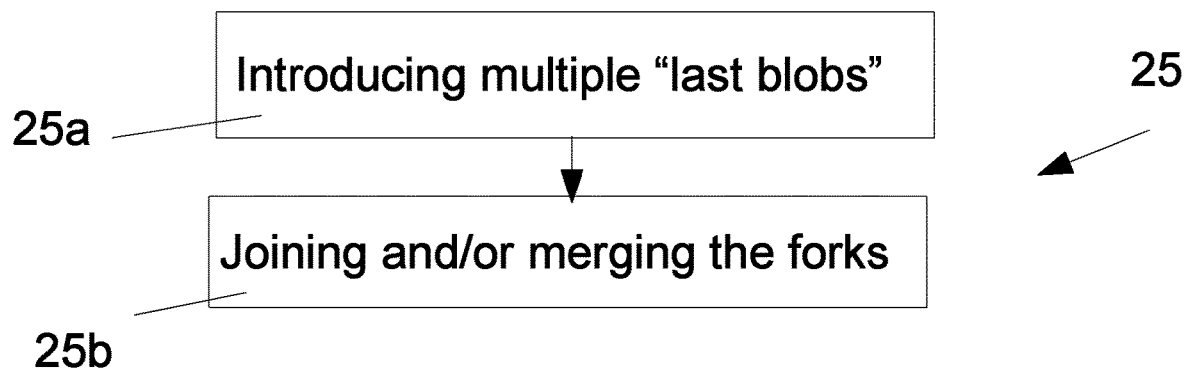

In the following description, the same numerical references refer to similar elements. Moreover, although the embodiments of the system and method for distributed storage of data consist of certain components as explained and illustrated herein, not all of these components are essential and thus should not be taken in their restrictive sense. It is to be understood, as also apparent to a person skilled in the art that other suitable components and cooperation thereinbetween may be used for the system and method for distributed storage of data, as will be briefly explained herein and as can be easily inferred herefrom by a person skilled in the art.

In general terms, the present system and method for storage of data relies on small, discrete, independent storage units referred herein as "core objects", which are agglomerated into larger entities referred herein as "blobs", with the blobs being stored in an open-ended, log-like storage structure under which different filesystems, databases, or other types of data can be stored and distributed over multiple, disparate and/or otherwise potentially incompatible storage mediums. In an embodiment, in order to increase security, the blobs are compressed and encrypted before being stored and decrypted and decompressed when retrieved. In an alternative embodiment, the core objects can also be individually compressed and encrypted within the corresponding blob (and be subsequently decrypted and decompressed), in addition to the blobs being themselves compressed/decompressed and encrypted/decrypted. One skilled in the art will understand that other terms, such as "pods" or the like could have been used to refer to the storage units referred herein as blobs.

As will become apparent in view of the description below, the system and method for storage of data allow the blobs to be freely moved, copied and shared between various and otherwise potentially incompatible storage providers and/or devices, without requiring central coordination, tracking or synchronization and even while concurrent updates are in progress.

In the course of the present document, the term "core object" is used to refer to basic storage units which can include any arbitrary logical data, such as, for example and without being limitative database records, file fragments, metadata, directory indexes, or the like. The term "blob" is used to refer to the containers including multiple core objects and which are stored on the storage vessels known as "backends" (or "storage nodes"). The term "backend" is used to refer to autonomous storage vessels and includes for example and without being limitative, local hard disks, flash memory, cloud storage providers, and zones, buckets or other segregation units thereof, network attached drives, or any storage media (or partition thereof) or service capable of storing data. The term "collection" is used to refer to a group of core objects, blobs and backends forming a coherent unit that can be managed as a whole. A collection can represent one or more user-visible filesystems, databases, object stores, or any other form of grouping needed to keep related data together. Other designative terms such as "cosmos" could have been used to refer to a group of core objects, blobs and backends forming a coherent unit.

Referring generally to FIG. 1, there is provided an embodiment of a method for performing data storage 10, which allows data to be freely distributed and hosted on various devices and services with high flexibility and security. In the embodiment shown, the method for performing data storage 10 includes the steps of receiving data to be stored from a data source (step 11), segmenting the data into core objects (step 12), grouping the core objects into blobs (step 14), compressing the blobs (step 16), encrypting the blobs (step 18), storing the blobs on at least one backend (step 20) and selectively retrieving corresponding blobs from one of the at least one backend upon request of the stored data (step 26).

Figure 2:
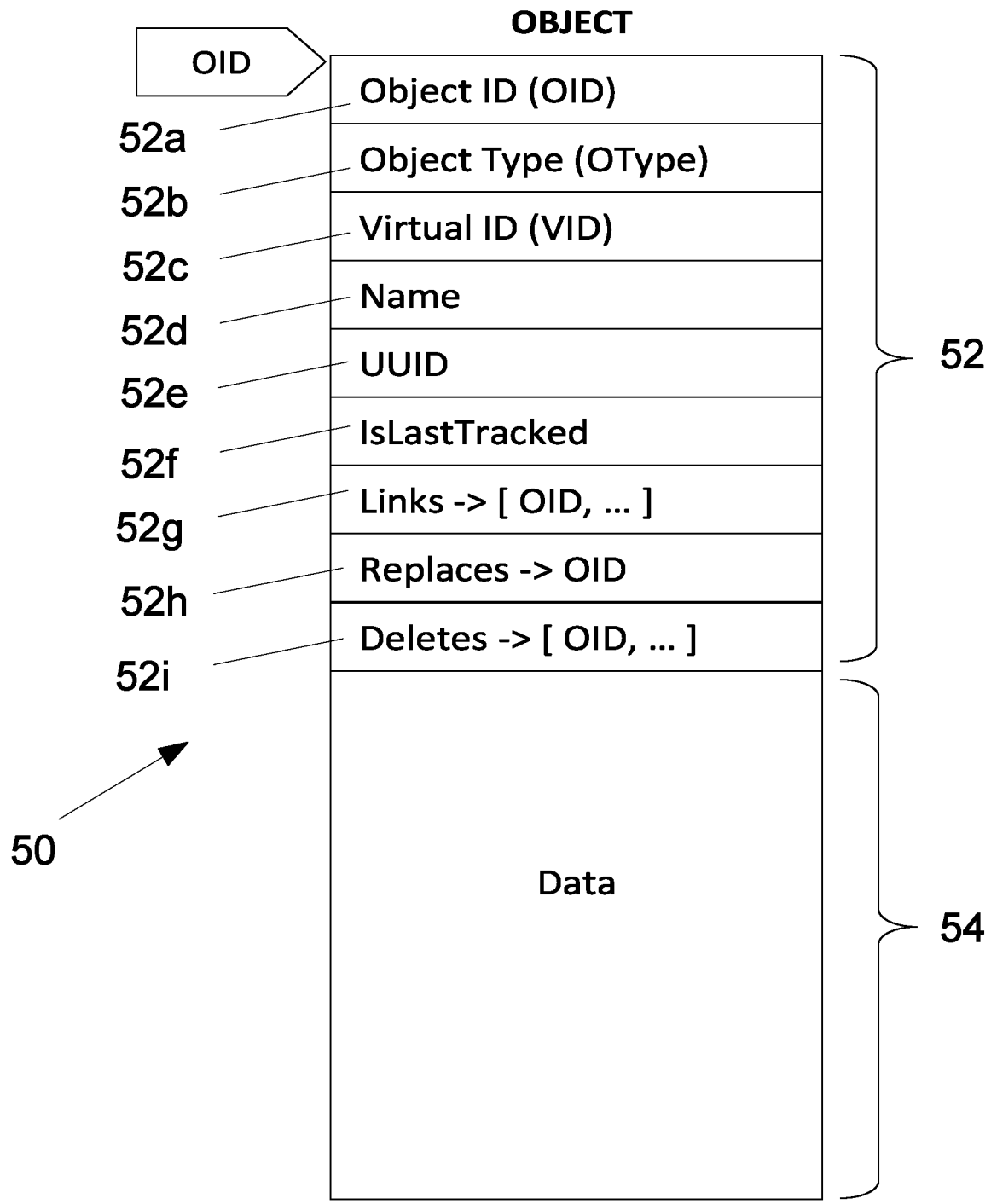
FIG. 2 is a schematic representation of an embodiment of an object used for data storage according to the method of FIG. 1.

Referring to FIGS. 1 and 2, as mentioned above, the data held into the core objects 50 generated at step 12 can be any form of arbitrary, binary data. In an embodiment, each core object 50 includes a header 52 describing the contents of the core object 50 and a payload 54 containing the actual data for the core object. For example and without being limitative, the header 52 can include information such as, Object ID (OID) 52a, Object Type (OType) 52b, Virtual ID (VID) 52c, name (or alias) 52d, Universal Unique ID (UUID) 52e, flag indicating whether the object is being tracked as the last object of its type (IsLastTracked) 52f, links to related objects (links) 52g, ID of object replaced by current object (replaces) 52h and/or ID of other objects deleted by current object (deletes) 52i. As will be described in more details below, the OID 52a is an identifier of the object and the OType identifies the purpose and format of the content of the core object 50, which helps in decoding the payload. The Virtual ID (VID) 52c, name 52d, Universally Unique ID (UUID) 52e, or other types of identifiers, can be referred to as object identification information which allows objects 50 to be located using alternate identifiers other than the official OID 52a. The flag indicating whether the object is being tracked as the last object of its type (IsLastTracked) 52f, links to related objects (links) 52g, ID of object replaced by current object (replaces) 52h and/or ID of other objects deleted by current object (deletes) 52i is collection management information which can be used for collection management, as will be described in more details below. One skilled in the art will however understand that, in an alternative embodiment, the core objects 50 can be structured differently and/or contain different information than in the embodiment shown.

Every core object 50 generated is immutable, i.e. the content of the core object is permanent and cannot be altered once the object has been created, committed and written to a collection. In view of the above, the content of an object cannot be updated. Therefore, in the case where the content of an object needs to be updated, a new core object 50 must be created. In an embodiment, the old object can be flagged as "replaced" so it may be subsequently removed from the collection, as will be described in more details below with regards to garbage collection. One skilled in the art will also understand that, in an embodiment, instead of replacing an entire object, the content of an updated core object may also be reflected by creating a second core object containing only differential information about the original core object.

Moreover, each one of the core objects 50 is identifiable by the primary identifier referred to as the Object ID (OID) 52a. The OID 52a is a collection-unique, immutable, arbitrary-length identifier assigned to the core object 50 when it is created. The collection-unique character of the OID 52a means that each OID 52a is assigned only once to a given core object 50, and is never reused for the lifetime of the collection, even after a core object 50 is deleted. When combined with immutability, the collection-unique OID 52a becomes a de facto signature of a given immutable core object 50. In other words, the collection-unique character of the OID 52a creates a permanent and inseparable relationship between a given OID 52a and the precise, invariable contents of the core object 50. Given that core objects 50 are immutable and OIDs 52a are collection-unique, objects cannot be updated, when data associated to a specific core object 50 is updated, at least one new core object 50 associated to the updated data is created and is assigned its own new unique OID 52a. The collection management for managing data update will be described in more details below.

In an embodiment, the collection-unique OIDs 52a are assigned to the generated core objects 50 using ever-increasing arbitrary-length sequential integers as OIDs 52a, i.e. each newly created core object 50 is assigned an OID 52a having an integer value corresponding to the last attributed OID+1. One skilled in the art will however understand that, in alternative embodiments, other OID assignation practices can be used for assigning a collection-unique OID to each newly generated OID.

Figure 3:
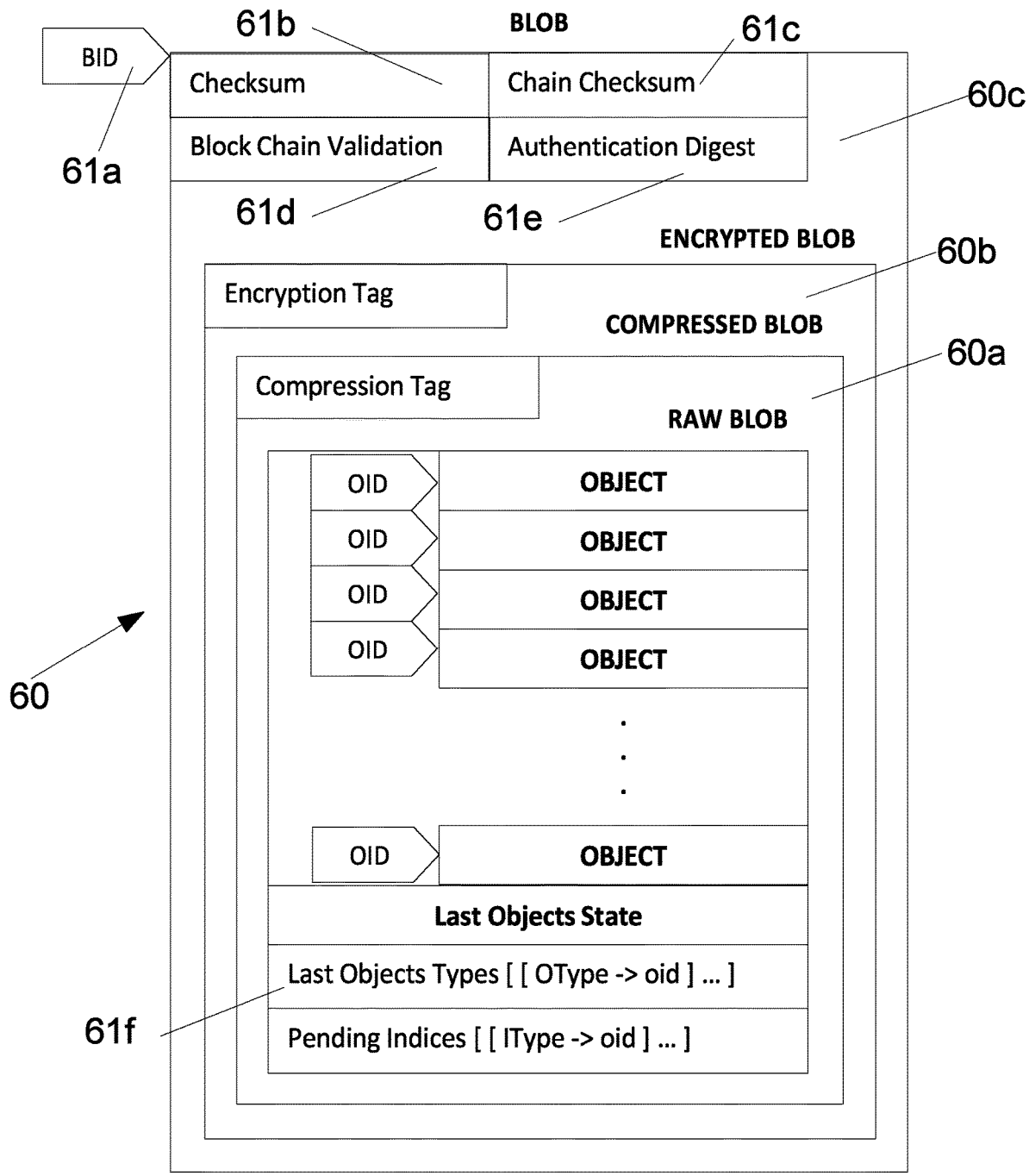
FIG. 3 is a schematic representation of an embodiment of a blob used for data storage according to the method of FIG. 1.
Figure 4:
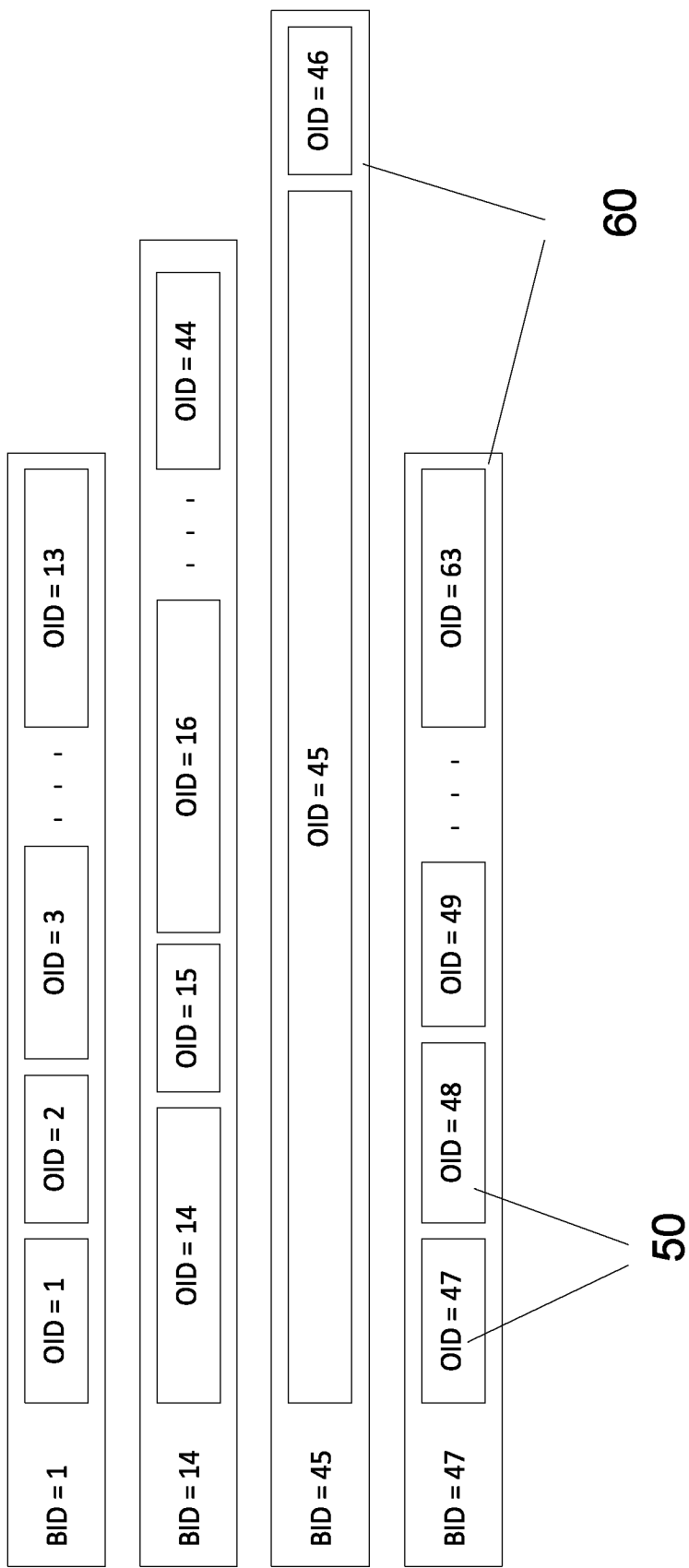
FIG. 4 is a schematic representation of an exemplary embodiment of a collection including a plurality of blobs each having a blob ID corresponding to the object ID of a first object of the blob, with the objects being numbered sequentially.

Referring to FIGS. 1, 3 and 4, in an embodiment the core objects 50 are assembled at step 14 into a raw blob 60a, which corresponds to the raw content of the blob of FIG. 3, before compression and encryption is applied. As mentioned above, in an embodiment (not shown), the core objects 50 can be individually compressed and encrypted. In the embodiment shown, the raw blob 60a includes a stream of all core objects 50 contained in the blob 60. In an embodiment, the raw blob 60a also includes information about the last core objects 50 (or latest core objects) of the collection when the blob 60 was written (Last Objects State). For example and without being limitative, such information can include a list of core object types (Otypes) 52b and OIDs 52a for objects that are tagged as the last core objects 50 of their types when the blob 60 was written (Last Objects Type). Once again, the information about the last objects 50 of the collection when the blob 60 was written (Last Objects State) is collection management information which is used for collection management and will once again be described in more details below.

In an embodiment, the raw blob 60a is compressed into a compressed blob 60b (step 16) and the compressed blob 60b is encrypted (step 18), thereby resulting in the encrypted blob 60c. One skilled in the art will understand that, in an embodiment, the raw blob 60a or compressed blob 60b could be directly used as blob 60, without compression/encryption, compression/encryption being used to reduce the size of the blobs and increasing security thereof during storage.

In view of the above, in an embodiment where the raw blobs 60a are encrypted, the blobs 60 contain both data and metadata information and are identified solely by their BID. Consequently, the data and metadata is fully encrypted before it is stored on the backend (local media, cloud storage provider, etc.). In an embodiment, each blob 60 is individually tagged as to the encryption algorithm used, which allows the blobs 60 to be individually and autonomously encrypted using various encryption algorithms and keys. Such individual encryption increases the confidentiality of the data stored using the present method for performing data storage.

One skilled in the art will understand that the directory, file, or other data to be stored in the core objects 50 can themselves be individually encrypted with private encryption keys, before being stored using the present method, such that data can be shared securely with other users. In other words, even users which have access to blob decryption keys to read a collection can be prevented from reading the data itself unless the user has the appropriate data decryption keys. This effectively allows a collection to be shared with multiple users, with full security, without relying on central servers or software-based protections.

In an embodiment, all blobs 60 include an initial chain checksum (Chain checksum) 61c, which is a checksum value that is calculated from the blob 60 when it was created, plus the chain checksum of the previous blob 60. This chain checksum 61c creates a unique chain value of all blobs that were ever created in the collection. For example and without being limitative, in operation, the verification that the last blobs of all backends have matching chain checksums 61c can ensure that all the blobs 60 belong to the same collection. All blobs 60 can also include a Keyed hash message authentication code (HMAC) (Authentication Digest) 61e designed to cryptographically confirm that the blob 60 was produced by an authorized user and has not been forged and an integrity checksum value (Checksum) 61b that helps to quickly detect errors that may have been introduced during the transmission or storage of the blob 60.

In an embodiment, the blobs 60 can also include a block chain validation hash structure (Block Chain Validation) 61d which can be used to validate a chain of blobs of a collection, by a peer network, in accordance with known block chain validation principles, methods and process. For example, in an embodiment, block chain validation can be performed without transmitting or disclosing the content of the blobs, by having the network validate the authentication digest of the blob instead of the blobs themselves. It will be understood that, if the authentication digest is used for block chain validation as described above, the payload hashed by the authentication digest should also include the digest of the previous blob.

Each one of the blobs 60 is identified by a collection-unique Blob ID (BID) 61a. In order to allow identification of the blob 60 that contains a given object 50 directly from the OID 52a of a sought core object 50, without using indices or maps, the collection-unique BID 61a is a derivative of the OIDs 52a of the objects 50 contained in the specific blob 60. For example and without being limitative, in an embodiment the ever-increasing arbitrary-length sequential integer attributed OID 52a of the first object 50 in the blob 60 is used as BID 61a for the blob 60. Using this implementation, the blob 60 containing a specific object 50 can easily be identified as the blob 60 with the highest BID 61a that is lower or equal to the sought OID. One skilled in the art will understand that, in alternative embodiments other implementation where the collection-unique BID 61a is a derivative of the OIDs 52a of the objects 50 contained in the blob 60 can also be used. Similarly to OIDs 52a, BIDs 61a are generally also assigned only once to a given blob 60, and remain unique for the lifetime of the collection. In an embodiment, the BIDs 61a can be encrypted, to avoid disclosing the actual sequence of blobs.

In an embodiment, BIDs 61a are also predictable, such that it is possible to predict the next BID 61a that will be written in a collection and to identify the last blob of a collection. In the embodiment where the ever-increasing arbitrary-length sequential integer attributed OID 52a of the first object 50 in the blob 60 is used as BID 61a for the blob 60 (see FIG. 4), the BIDs 61a are implicitly predictable. In FIG. 4, the four blobs 60 are provided with blob having BID #1 including objects having OID #1 to #13, blob having BID #14 including objects having OID #14 to #44, blob having BID #45 including objects having OID #45 to #46 and blob having BID #47 including objects having OID #47 to #63. In such an embodiment, the next BID corresponds to the OID of the last object 50 of the last blob 60 plus 1 and the last blob of a collection is simply the blob 60 with the highest BID. Once again, one skilled in the art will understand that, in alternative embodiments, alternative implementations for producing predictable BIDs and identifiable last blob of a collection can also be used.

In an embodiment, the generated blobs 60 can be subsequently split, with the split blobs being assigned new collection unique BIDs 61*a* which are each a derivative of the OIDs 52*a* of the core objects 50 now contained the specific blob 60. It will be understood that, when blobs are split, the assigned BIDs 61*a* must still allow identification of the blob 60 that contains a given object 50 directly from the OID 52*a* of a sought core object 50. For example, in the embodiment where ever-increasing arbitrary-length sequential integer attributed OIDs of the first object 50 in the blob 60 is used as BID 61*a* for the blob 60, a split should always result in core objects 50 with adjacent OIDs being grouped in corresponding blobs 60, with the OID 52*a* of the core object 50 having the lowest OID 52*a* being used as BID 61*a* for each new blob 60.

Moreover, in an embodiment, adjacent blobs 60 (i.e. blobs 60 having adjacent BIDs 61*a* in the collection 80) can also be fused together, with the fused blob being assigned a new collection unique BID 61*a* which is a derivative of the OIDs 52*a* of the core objects 50 now contained the specific blob 60. Once again, the assigned BIDs 61*a* must still allow identification of the blob 60 that contains a given object 50 directly from the OID 52*a* of a sought core object 50. For example, in the embodiment where ever-increasing arbitrary-length sequential integer attributed OIDs of the first object 50 in the blob 60 is used as BID 61*a* for the blob 60, a fusion should always result in the OID 52*a* of the core object 50 having the lowest OID 52*a* being used as BID 61*a* for the new blob 60 resulting from the fusion.

In an embodiment, the core objects 50 of a given type (Otype) 52*b* can be grouped in separate blobs 60 from core objects 50 of a different Otype 52*b*. Hence, in such an embodiment, the blobs 60 are also associated to a type (i.e. the type of the core objects 50 grouped herein) and the blobs 60 of different types can be stored on different backends 70. This can be used for example to isolate metadata from data objects in order to improve metadata read performance, to implement different object encryption algorithms/keys based on the Otype 52*b*, etc. In such an embodiment, in order to support typed cores objects 50, blobs 60 and backends 70, the BID 61*a* of a given blob 60 can be derived from the OID 52*a* of the corresponding core objects 50 at the backend level rather than at the collection level, with the blobs 60 storing core objects 50 having discontinuous OIDs 52*a*. In other words, the BID 61*a* of a given blob 60 can be derived from the OID 52*a* of the corresponding core objects of the specific Otype 52*b* rather than from the OID 52*a* of all generated core objects, thereby resulting in core objects 50 having discontinuous OIDs 52*a* being stored in the blobs 60. Therefore, any subsequent request to retrieve a core object 50 should be handled taking into account the Otype 52*b* of core object 50 to be retrieved, for example by querying only the backend(s) 70 associated to the specific Otype 52*b* of the core object 50 to be retrieved.

In another embodiment, the blobs 60 can also be isolated based on their object types (Otype) 52*b*, such that certain Otypes 52*b* are preferably not written in the same blob. For example, large data objects can be requested to be isolated from metadata and index objects, thereby improving performance by preventing large amounts of data to be retrieved at the same time metadata or index information is retrieved. Hence, in an embodiment, before performing assembly of core objects 50 into a blob 60 the Otype 52*b* of the core objects 50 to be assembled into the blob 60 can be considered to determine whether an object should be added to an existing blob 60 or created in a new blob 60.

Figure 5:
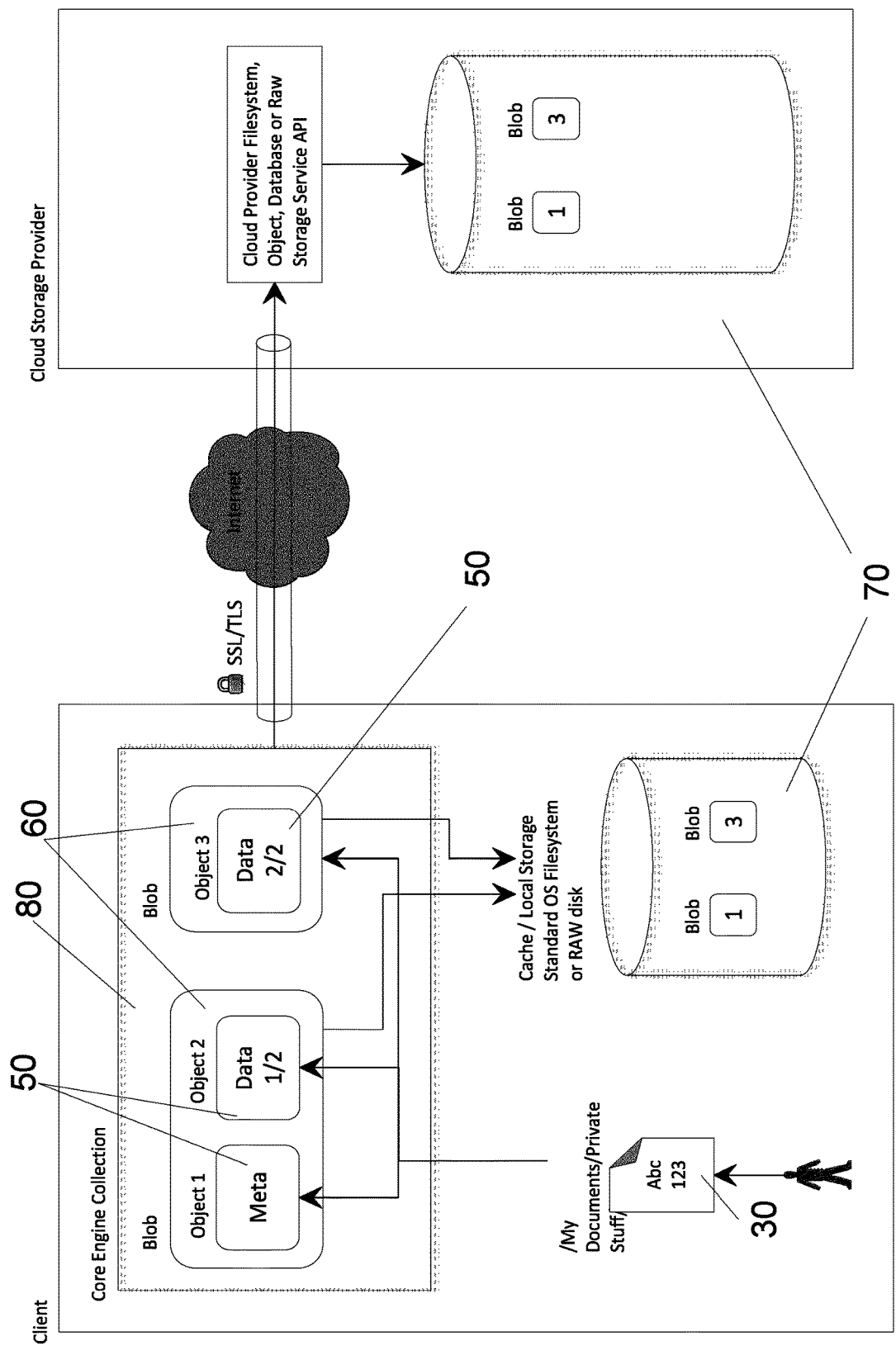
FIG. 5 is a schematic representation of an exemplary embodiment of the storage of a file using the method of FIG. 1.

Now referring to FIG. 5, an example of storage of a file 30 using the above described structure for the method of storing data 10 is shown. In the embodiment shown in FIG. 5, a file 30 is stored in the cloud using the above described method 10. In the embodiment shown, the file 30 is segmented into three objects 50, one containing metadata such as the filename, creation date, etc., and two containing the content of the file as data fragments. The first two objects 50 are assembled into a first blob 60, and the third object is placed in another blob 60. The blobs 60 are compressed, encrypted, and transmitted through a secure connection on the Internet to a cloud storage provider acting as backend 70, where the blobs 60 can be stored as files, database records, objects, or raw storage. In the embodiment shown, a copy of the blobs 60 is also kept in a local cache (also operating as backend 70), which can also be used as direct storage medium. It will be understood that in order to retrieve the stored data, any copies of the blobs 60 can be used to perform the reversed process where the blobs 60 are read, decrypted, decompressed, and the file is reassembled from its segments.

In view of the above, it will be understood that at step 20, the step of storing of the blobs 60 on at least one backend (step 20) is performed to store the blobs onto storage mediums. As mentioned above, the backends 70 are autonomous storage vessels and are simply required to be able to query, store and retrieve blobs using their BID 61*a*, in the form appropriate for the supported service or device (e.g. as a file, database record, cloud object, physical device block, etc.). Backends 70 are not required to support metadata, structures, know how objects or blobs are organized, their purpose or the like. Backends 70 are, by nature, fully generic, simple storage appendages that blindly store and retrieve blobs 60 based on their BIDs 61*a*. In the embodiment shown, the backends 70 are embodied by a cloud storage provider and the local cache, but one skilled in the art will understand that in alternative embodiments, the backends 70 can be any storage media or service capable of storing data. In view of the above described structure, differences in backend storage's abilities and features have substantially no impact. It will be understood that multiple distributed backends 70 can be used such that distributed data storage can be performed by storing the blobs into different distributed backends 70. Moreover, the blobs 60 can be freely scattered over multiple backends 70 and subsequently moved between backends 70 without any impact on data integrity.

As mentioned above, the blobs 60, core objects 50 and backends 70 are grouped together in a coherent unit that can be managed as a whole and referred herein as the collection 80. Among other things, the collection 80 ensures that OID's 52*a* and BID's 61*a* are always unique for the collection 80. In an embodiment, for each collection 80, the collection management information stored in the core objects 50 and blobs 60 and defined above is used as primary mechanism to hold the entire collection coherent and up to date.

Referring to FIGS. 1 to 4, in an embodiment, the method 10 includes a further step of maintaining a collection state 22 reflecting the state of the collection at a specific time where a blob 60 is written. In operation, in order to allow the maintaining of the collection state, the collection management information of each blob 60 includes the state of the collection and its core objects 50 when the blob 60 was written. In an embodiment, the state of the collection includes the list of object types (Otype) 52*b* and OIDs 52*a* for last core objects 50 of each Otype 52*b* that are tagged as the last objects when the blob 60 is written (Last Objects Type 61*f*). Indeed, as mentioned above, in an embodiment, core objects 50 have a given type (OType) 52*b* designed to indicate the general nature of each core object 50 (for example and without being limitative to distinguish between a directory index object and a file data fragment object, and parse each object accordingly). When a core object 50 is created, it can be flagged as the "last" (i.e. the latest or most recently created) core object of its Otype 52*b*. In an embodiment, the OID 52*a* of each last core object 50 for each Otype 52*b* is recorded in the state of the collection of the last blob 60, such that the last core object 50 of a given Otype 52*b* can subsequently be retrieved, without having to know its OID 52*a*. Evidently, in order to locate the last core object 50 of a given Otype 52*b*, identification of the last blob 60 of a collection is also required.

Moreover, the collection management information includes object linking information (i.e. objects are linked together using OIDs 52*a* or other object identification information) allowing core objects 50 to refer to one another. The object linking information of a particular core object 50 is stored directly in the corresponding core object 50 and defines the bulk of the structure by which the core objects 50, the blobs 60 and the collection 80 are held together in a tree-like structure of core objects 50 linked to one another. In an embodiment, the collection 80 is defined by "head" objects 50, which corresponds to the core objects 50 being flagged as the last of each object types, and then linked successively to other core objects 50, grouping objects 50 as a tree-like chain of core objects 50. In such an embodiment, the "tail" of the collection 80 (i.e. the last blob and the last objects types in the collection state) acts as the "head" of all objects 50 within the collection 80. It will be understood that in an alternative embodiment, alternate ways of identifying and linking objects can also be used. Moreover, in an alternative embodiment, subsets different than core object types (Otype) 52*b* can be used to link core objects 50 to one another with the last object being the head object.

In the case of a data update (a new core object 50 associated to the updated data being created and assigned its own new unique OID 52*a*), the links between core objects 50 need to be updated in order to reflect that the new core object 50 now replaces the old core object 50. In other words, the core objects 50 previously linking to the old core object 50 by OID 52*a* now need to link to the new core object 50 by OID 52*a*. Depending on the complexity of the tree structure of the objects 50, this could lead to a long cascade of referring core objects 50 that successively need to be updated. In order to reduce the required cascade effect, core objects 50 can be structured according to known data structure limiting such cascading, such as for example and without being limitative, by including within the updated core objects 50 information about the OID link updates that would need to be applied to the parent object, without actually updating the parent object itself, or by using non-OID links as described below as an alternative embodiment, at strategic points in the object trees in order to prevent OID link updates from cascading to the top of the tree. In alternative embodiments, object identification information such as, aliases, virtual IDs, private indices or the like, which are alternate identifiers by which an object may also be referred to, in addition to its OID 52*a* and which can be reassigned later on to newer core objects 50 can also be used. For example and without being limitative, in an embodiment, each core object 50 can include a Virtual ID (VID) 52*c* which is initially identical to the OID 52*a*. When a new core object 50 is created and is flagged as replacing an older core object 50, the new core object 50 can automatically inherit the VID 52*c* of the older core object 50. Internally, VIDs 52*c* can be stored in VID/OID pairs to allow VID/OID association. Hence, VIDs 52*c* can be used to link core objects 50 together using an identifier which is automatically kept up to date when objects themselves are updated and replaced. In another alternative embodiment, private indices can be used to track and link objects 50 externally by their OID 52*a*, instead of storing links inside objects.

In an embodiment, the method for performing data storage 10 can further include a step of performing garbage collection 24, to reclaim storage space occupied by core objects 50 which are no longer valid, either because they have been replaced by newer core objects 50 (i.e. as a result of a data update), deleted, or because they are no longer being referenced (linked to) by any other core object 50. In an embodiment, the step of performing garbage collection 24 includes a step of identifying objects to be cleaned-up (or flagging) 24*a*, which can be implicit or explicit and a step of physically removing objects from the collection and blobs (purging) 24*b*.

In an embodiment, during the step of flagging 24*a*, core objects 50 can be implicitly flagged as no longer required when they lose all references from other core objects 50. One skilled in the art will understand that several methods for flagging objects as no longer being referenced can be used. For example and without being limitative, in an embodiment, core objects 50 being flagged as unreferenced can be added to a purge candidate list being processed during the purging step 24*b*, with the last core objects 50 written in a collection never being added to the purge candidate list even if they are unreferenced in order to protect collections that are being actively updated. Moreover, in an alternative embodiment, core objects 50 can also be explicitly flagged as eligible for garbage collection, either by being flagged as "replaced" when new core objects 50 are created to replace them, or as "deleted" by core objects 50 that explicitly delete them. In such cases, the replaced/deleted core objects 50 OIDs 52*a* can be added to an internal index, along with the OIDs 52*a* of the objects that replaced/deleted them, with the index being used as the purge candidate list.

During the purging step 24*b*, the core objects 50 and blobs 60 that are listed in the purge candidate list are physically removed. One skilled in the art will understand that various purge parameters, such as blob usage thresholds, minimum age of objects that should be purged, or the like, can be set to optimize the purge process. The purge parameters are useful in order to limit the purge of objects, for example and without being limitative for archiving purposes, as will be described in more details below. It will be understood that blobs 60 can be purged fully or partially. In a case where all objects 50 within a blob 60 are to be physically removed, the blob 60 can be completely deleted from the backend(s) 70. However, in a case where only some objects 50 of a blob 60 are to be physically removed, the blob 60 can be opened (i.e. retrieved, decrypted and decompressed), the specific objects 50 can be removed, and the blob 60 can be recompressed, re-encrypted, and written back to the corresponding backend(s) 70 under the same BID 61*a*.

One skilled in the art will understand that garbage collection is not required to be identical for each backend 70. In other words, partially or fully purged blobs do not need to be synchronized across backends 70. Some backends 70 can continue to host blobs 60 with all of the original objects 50 in them while other backends 70 can have only cleaned-up blobs 60, without affecting the integrity of the collection 80. One skilled in the art will understand that, since all blob versions contain the exact same copy of active immutable objects 50, any version of a blob 60 can be used to reflect the current state of the collection 80. Variations between versions of blobs 60 only affect the amount of storage used, and the availability of historical data (unreferenced core objects 50). One skilled in the art will understand that, this asymmetry can be useful for archival purposes.

For example and without being limitative, in an embodiment, high-performance backends 70 such as local hard disks, SSD drives, SAN and cached cloud storage or the like can be designated to host fully purged blobs 60 that contain only the most recent objects 50, while other lower-performance or lower-cost backends 70 such as WORM devices (i.e. Write Once Read Many media such as DVDs, Blu-ray Discs, or the like), low cost & performance hard disks, and long-term archival cloud storage services, or the like can be designated to host blobs with a greater quantity of original (unreferenced) objects 50.

Figure 6:
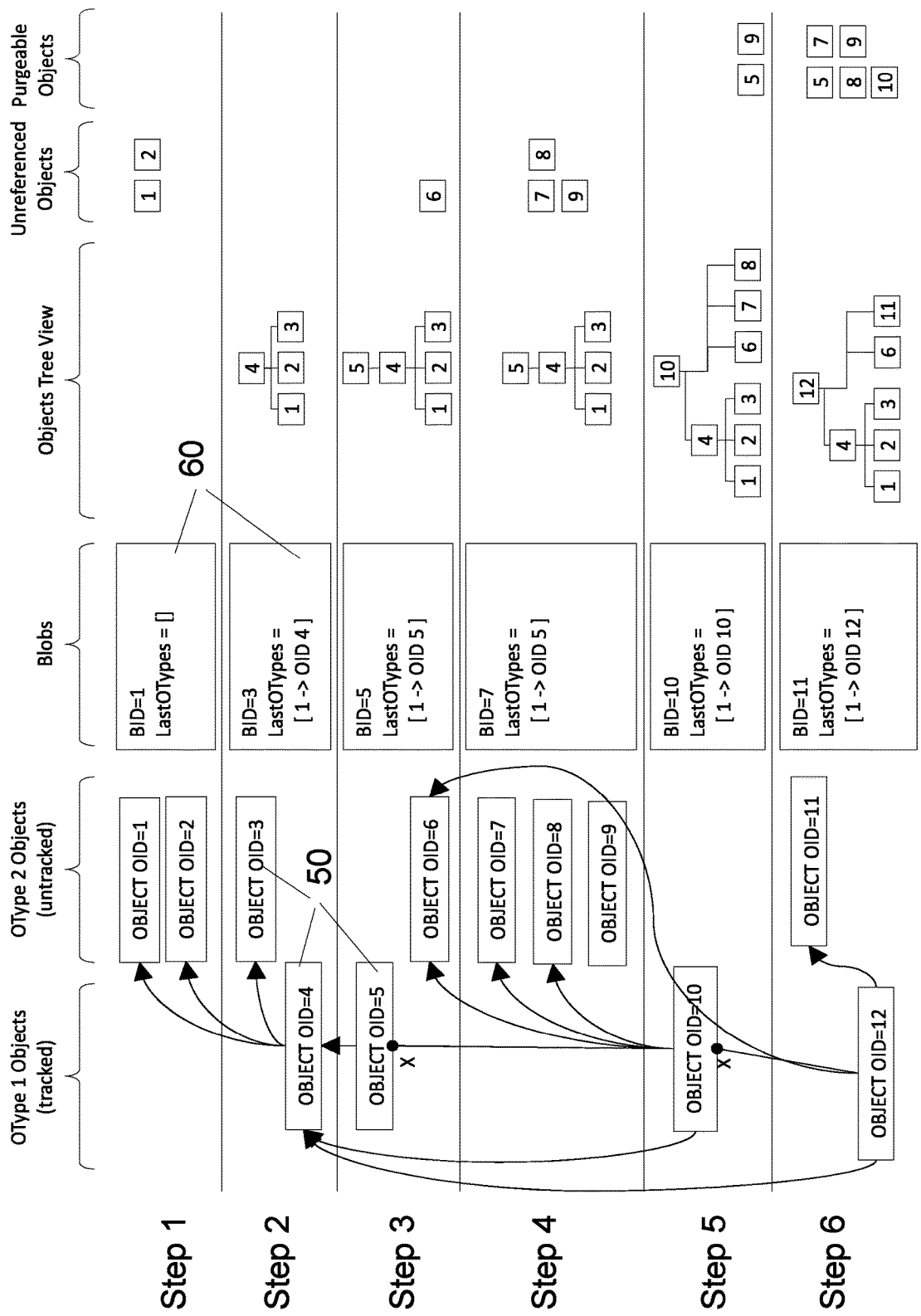
FIG. 6 is a schematic representation of an exemplary embodiment of a collection management using last object types and object linking and the impact on garbage collection.

Now referring to FIG. 6, an example of collection management using last objects types, linking and their impact on garbage collection in accordance with an embodiment is shown. In the example of FIG. 6, the evolution of the collection 80 is followed blob 60 by blob 60.

Initially, at step 1, two core objects 50 (which are assigned OIDs #1 and #2) are written in Blob #1. At this initial stage, neither core object 50 is tracked as the last object of its type (Otype) 52b. The core objects 50 do not contain links and are not linked to. At this point, Object #1 and Object #2 are considered unreferenced objects, but are not considered as purgeable core objects 50 as they are the very last objects of the collection.

At step 2, two more core objects 50 (assigned OIDs #3 and #4) are added and are written in Blob #3. Core object #4 is tracked as the last core object 50 of its type (Otype) 52b, and contains links to core objects #1, #2 and #3, thereby generating a tree of objects, with core object #4 as the head, and linking all other objects, including those written in Blob #1. The head is recorded as last object of type #1 (the object type of object #4 in this example) in the collection state of blob #3.

At step 3, two more core objects 50 (assigned OIDs #5 and #6) are added and are written in Blob #5. Core object #5 links to object #4, and is tracked as the last object of Otype #1 (i.e. object #5 is now the head of the tree of objects). Object #6 is, at this stage, unrelated to other core objects 50 and therefore is in an unreferenced state, but is not considered as a purgeable object as it is the last object of the collection.

At step 4, three more core objects (assigned OIDs #7, #8 and #9) are added and are written in Blob #7. Core objects #7, #8 and #9 are not tracked as the last object of their Otype. Core objects #7, #8 and #9 do not contain links and are not linked to. Again, these objects are considered unreferenced, but are not considered as purgeable core objects 50 because they are the last core objects 50 of the collection.

At step 5, a core object 50 (assigned OID #10) is added and is written in blob #10. Core object #10 replaces object #5. Object #10 is tracked as the last core object of its Otype (Type #1), and linked to objects #4, #6, #7 and #8. This restructures the tree of objects with object #10 now being the head. Object #5, being replaced by object #10 and object #9, now orphaned, are unreferenced and considered obsolete and can be added to the purge candidate list.

At step 6, two more core objects 50 (assigned OIDs #11 and #12) are added and are written in Blob #11. Object #12 replaces object #10. Object #12 is tracked as the last object of its Otype (Type #1), and is linked to objects #4, #6, and #11. This again restructures the tree of objects with core object #12 now being the head. Core objects #7, #8 and #10 become obsolete and can be added to the purge candidate list.

The example of FIG. 6 shows that, as core objects 50 are added, linked, replaced or discarded, the collection state in each blob 60 reflects the precise state of all active core objects 50 in the collection 80 at each of the steps. Such an example also allows easy understanding of how the structure produced using the method for performing data storage 10 can easily be used for time travel (or continuum exploration), as explained in more details below. In the course of the present description, the term "time travel" refers to the ability to go back in time and inspect the stored data as it existed in previous states. Using the above described structure, to travel in time (or perform continuum exploration) and review the state of a collection as it existed at a point in the past, the view of the "tail" of the collection 80 is redefined to be at a given BID 61a or OID 52a (i.e. manually redefining the last blob 60 to the point in time where the blob 60 with the given BID 61a or the blob 60 associated to the given OID 52a was the last blob 60). Hence, the view of all object trees and core objects 50 also reflects how they existed at the precise point in time where the blob 60 with the given BID 61a was the last blob 60. One skilled in the art will therefore understand that time travel can be performed without requiring any precise archiving process or "snapshot" of the stored data to be taken, and that as long as past objects have not yet been purged, there are no restrictions or limits to time travel within the stored data. One skilled in the art will also recognize that redefining the tail BID or OID view of the collection does not change the collection itself, and multiple users may hold different views of the collection at the same time.

In view of the above, the combination of time travel and optimized blob purge parameters can allow advanced archiving strategies using substantially reduced storage resources. For example, and without being limitative, in an embodiment (not shown) a continuity of backends 70 can also be used to emulate the behavior of prior art archival "snapshot" functions, while allowing the collection 80 to be time-traveled continuously at any single point in time prior to the data being frozen on an archival backend. In such an embodiment, a primary backend (archival backend) and a secondary backend of a collection can be layered such that all the original blobs are frozen in the primary backend and only the newer or partially purged blobs are recorded in the secondary backend. Hence, while both the primary backend and secondary backend can be used as possible backends 70 for the collection (i.e. both the primary backend and secondary backend can be used to retrieve data), updates and deletions are only recorded on the secondary backend. A similar strategy can later be used for the primary and secondary backends (the archival backends) with regards to a tertiary backend (i.e. the content of the secondary backend is also frozen, and the tertiary backend is introduced with newer or partially purged blobs being recorded in the tertiary backend). At this point, the primary, secondary and tertiary backends are used as possible backends for the collection, but only the tertiary backend is subject to object/blob addition and/or deletion.

One skilled in the art will also understand that full and incremental backup strategies can also be easily implemented using the above described blobs 60 and backends 70 for example, using mirrored layered backends 70 writing blobs 60 to two or more locations simultaneously. Alternatively, blobs 60 can be copied externally from a live backend 70 to a stand-by backend 70. It will be understood that, given that core objects 50 are immutable and blobs 60 are log-structured, there is no need to synchronize blobs 60 or proceed to a validation of which blobs 60 were modified since the last backup, the only blobs 60 that need to be backed-up or copied being the ones that are new.

In view of the above, it will be understood that the above-described structure provides a robust arrangement, where the loss or damage to a blob 60 can generally be recovered without causing data loss beyond the data of the specific lost or damaged blob 60. Indeed, given that the collection management information of each blob 60 includes the state of the collection and its core objects 50 when the blob 60 was written, a preceding blob 60 (i.e. a blob created before the specific lost or damaged blob) can generally be used to continue processing a request, even if the damaged or lost blob contained crucial structural information.

Such a recovery of the information can easily be performed in cases where previous blobs 60 still contain all of the necessary collection management information. However, in cases where garbage collection has been performed and has started cleaning up information, the previous blobs 60 may not readily contain all the information necessary to resume exploring the collection 80. Hence, in an embodiment, garbage collecting can be configured to retain critical objects, such as directory indices, even if they are technically obsolete, in order to avoid deleting information that may be subsequently relevant in the case of recovery of information following the damage or loss of a blob 60. Moreover, if garbage collection has been performed and information necessary to resume exploring the collection has been deleted, critical core objects 50 containing links to other core objects 50 can be reconstructed from the referred-to objects.

In an embodiment, the method for performing data storage 10 can further include a step of forking (or cloning) the collection into two or more distinct sub-collections 25, wherein each sub-collection 80 can evolve individually while still sharing the same physical blobs and backends for past objects and blobs that they have in common. When a collection 80 is forked, it is substantially the equivalent of taking a prior art "snapshot" or copying the entire collection 80 and then modifying the copy, to the exception that there is no real snapshot or copy but rather a simple shared portion between the forked collections 80. In an embodiment, in order to proceed with the step of forking the collection 25, the method for performing distributed data storage 10 includes the step of introducing multiple "last blobs" (i.e. splitting the "tail" of the collection).

From the multiple last blobs 60, each fork defines its own tree of objects. Hence, given the above described structure where the "last blob" is the key holding the state of a collection and all the core objects 50 of the collection together, each fork represents a unique view of the collection 80 (a unique sub-collection) and can create/update core objects 50 in this specific sub-collection, without affecting objects or the state of other forks or the base collection 80. It will be understood that, the method 10 can further include the subsequent step of joining and/or merging the forks, such that the updates performed individually in each sub-collection generated by the corresponding fork can be recombined into a single collection 80 containing a unique chain of core objects 50 and blobs 60.

In an embodiment, time travel can be performed in parallel on each individual fork.

It will be understood that, depending on the embodiment, the forks can be either logical or physical. As will be described in more details below, logical forks are created within the confines of the same backend and share the same blobs, OID and BID namespaces as other forks. Physical forks are implemented in separate backends and each maintain their own unique blobs, OID and BID namespace. One skilled in the art will understand that either fork type (i.e. either logical or physical fork) can be used to implement the step of forking a collection into multiple sub-collections of the present method 10.

One skilled in the art will understand that, since physical forks use distinct backends and namespaces, it is possible for the created physical forks to assign the same OIDs 52a and BIDs 61a to the generated objects and blobs. Therefore, when merging physical forks, it will be necessary to recreate the merged objects on the target fork with new unique OID's 52a. In other words, it is not possible to simply link objects between the generated forks, as is possible with logical forks. In view of the above, two or more physical forks can have colliding BIDs 61a OIDs 52a (i.e. similar BIDs 61a and/or OIDs 52a), given that physical forks are fully isolated (but distinguished through the unique Fork Identifier (FID) recorded in the blobs of each fork) and evolve independently from one another. Hence, in operation, the two or more physical forks operate similarly as different collections having only a shared portion, (i.e. the portion which was generated before the creation of the physical fork). In order to merge two physical forks, merge helpers are required to create new objects on the target fork corresponding to the objects created on the other physical fork and therefore reintegrate changes applied on another physical fork (See FIG. 7d and the corresponding example detailed below).

In an embodiment, the physical forks can be further protected by chain checksums. Such checksum values can be used to validate that physical forks are based on the same common blobs, before engaging a join or merge of the physical forks.

Figure 7A:
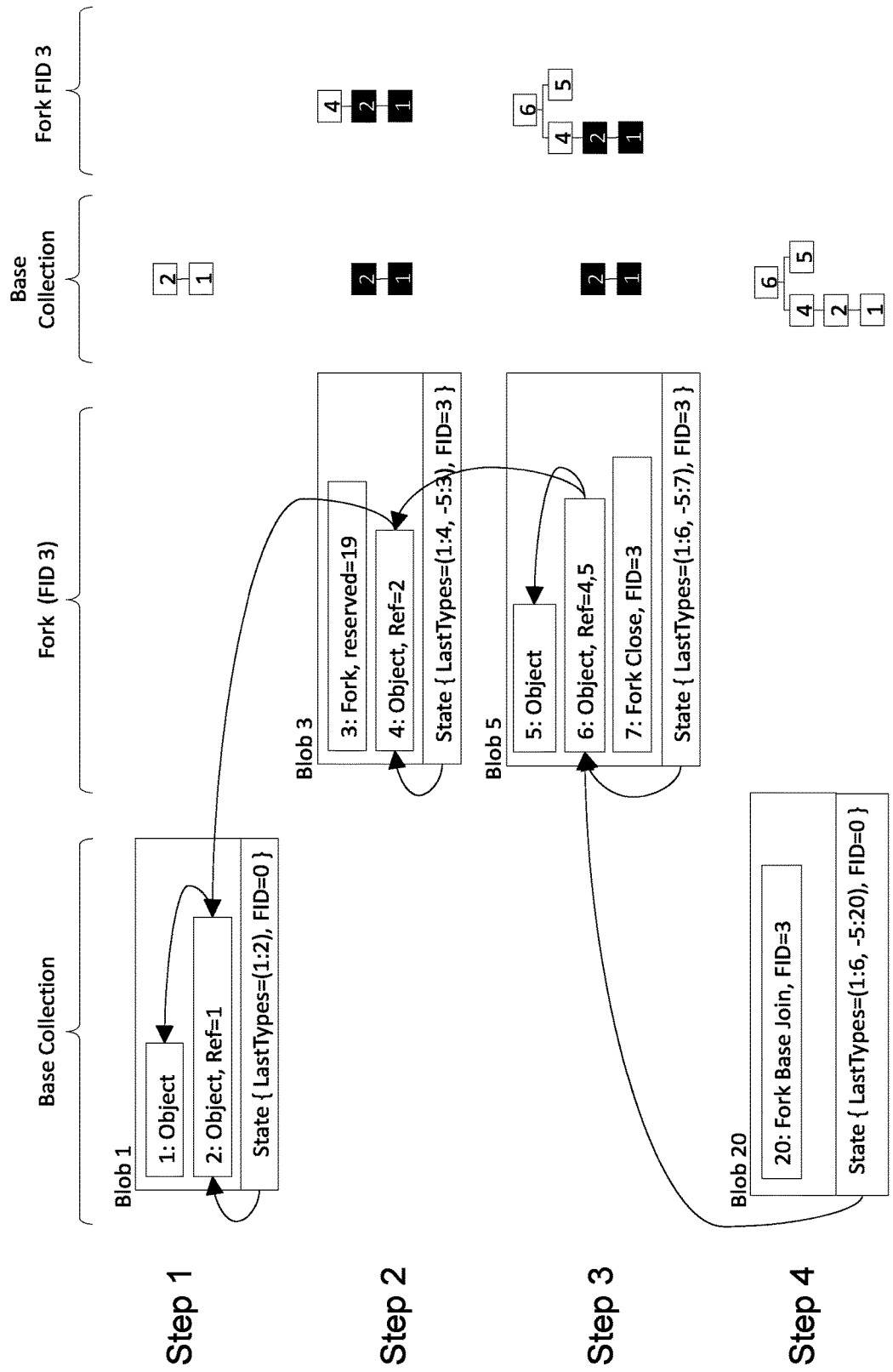
FIGS. 7a, 7b, 7c and 7d are schematic representations of exemplary embodiments of forking of a collection.

Referring to FIG. 7a, an example of forking of a collection in accordance with an embodiment where a logical fork is opened, updated, and subsequently joined back to the base collection is described. Once again, in the example of FIG. 7a, the evolution of the collection 80 and sub-collections is followed blob 60 by blob 60. In the example of FIG. 7a, there are two object types (Otypes) 52b for the core objects of the collection: Otype #1 for regular core objects, and Otype #−5 representing logical fork core objects.

At step 1, two core objects 50 are created (assigned OID #1 and #2) and are written in blob #1. Object #2 links to object #1 and is flagged as the last object of Otype #1. The object tree with objects #1 and #2 is reflected in the state of the collection stored in blob #1, with object #2 as last object of Otype #1.

At step 2, a logical fork core object is created (assigned FID #3 and reserving objects OIDs up to 19 for its own use) and an object (assigned OID #4) is created and written in blob #3. Object #4 is added to the collection in the sub-collection of fork #3, and is linked to object #2. The collection state stored in blob #3 reflects that blob #3 belongs to the sub-collection of fork #3, with a tree of objects starting with object #4. The collection state stored in blob #3 also reflects that the last fork object (OType #−5) is fork #3. At this point, the collection 80 includes two sub-collections (the sub-collection of the original collection and the sub-collection of fork #3), both sharing objects #1 and #2, but with the sub-collection of fork #3 having a larger object tree (i.e. also including object #4).

At step 3, two new core objects 50 (assigned OID #5 and #6) are created in the sub-collection of fork #3, and are stored in blob #5. Object #6 is linked to objects #4 and #5, and is flagged as the last object of its Otype (type #1). This creates a tree of objects with object #6 as the head (i.e. the last object) still sharing objects #1 and #2 with the sub-collection corresponding to the base collection. At step 3, fork #3 is closed by the writing of Fork Close Object #7, referring to fork #3. Blob #5 is written under fork #3, reflecting the latest state of the fork and its objects.

At this point, the collection has two forks: fork #0 (FID #0), which is the base collection, has a state showing the last object of Otype #1 is object #2 (OID #2), which forms a tree of two objects, (objects #1 and #2) and fork #3 (FID #3), which is a sub-collection of a closed logical fork, has a tree of objects with object #6 (OID #6) as its head (and which links to objects #5, #4, #2 and #1). The collection state in the sub-collection of fork #3 also shows that the last fork object (Otype #–5) has an OID #7, thereby showing that fork #3 has been closed.

At step 4, the sub-collection of logical fork #3 is joined back into the base collection by creating a Fork Base Join core object 50 (assigned OID #20, which is the next non-reserved OID for the base collection (given that OIDs up to #19 were reserved to fork #3) and written in blob #20. The join is performed by updating the collection state to reflect the state of the sub-collection of fork #3, thereby automatically integrating all objects from the object tree of the sub-collection of fork #3 into the main collection (FID #0). Because the join is done on the base collection, blob #20 also belongs to the base collection and has a FID #0. At this point, the fork history can be examined through fork Object #20 (the last object of Otype #–5), but otherwise the collection is considered as having no forks and works like any other standard collection.

Figure 7B:
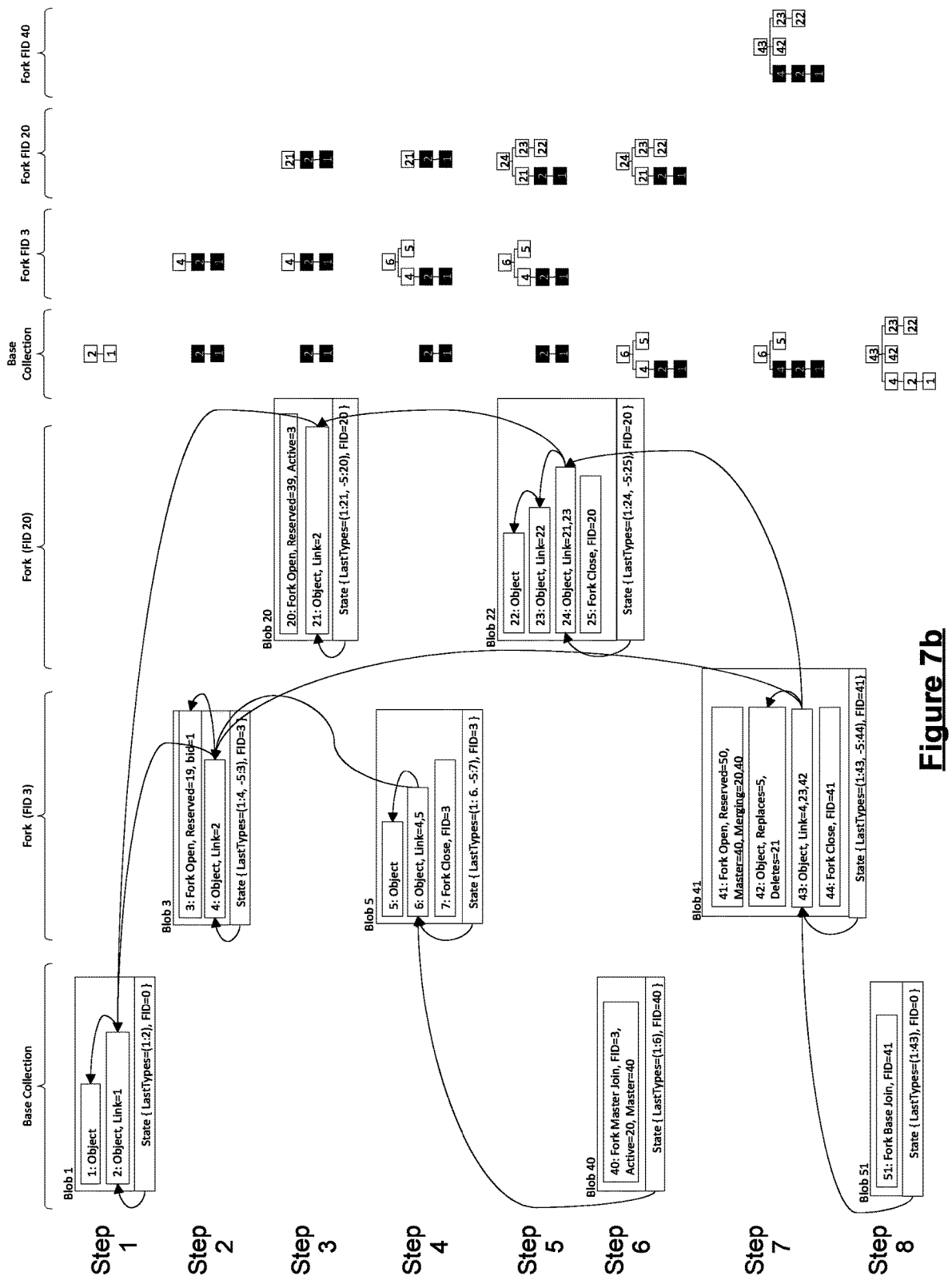

Referring to FIG. 7b, an example of forking of a collection in accordance with an embodiment where two logical forks are opened, updated, and subsequently merged back to the base collection is described. Once again, in the example of FIG. 7b, the evolution of the collection 80 and sub-collections is followed blob 60 by blob 60. In the example of FIG. 7b, there are once again two object types for the core objects of the collection: Otype #1 for regular core objects, and Otype #–5 representing logical fork core objects.

At step 1, two core objects 50 are created (assigned OID #1 and #2) and are written in blob #1. Object #2 links to object #1 and is flagged as the last object of Otype #1. The object tree with objects #1 and #2 is reflected in the state of the collection stored in blob #1, with object #2 as last object of Otype #1.

At step 2, a logical fork core object is created (assigned FID #3 and reserving objects OIDs up to #19 for its own use) and a core object (assigned OID #4) is created and written in blob #3. Object #4 is added to the collection in the sub-collection of fork #3, and is linked to object #2. The collection state stored in blob #3 reflects that blob #3 belongs to the sub-collection of fork #3, with a tree of objects starting with object #4. The collection state stored in blob #3 also reflects that the last fork object (OType #–5) is fork #3. At this point, the collection 80 includes two sub-collections (the sub-collection of the original collection and the sub-collection of fork #3), both sharing objects #1 and #2, but with the sub-collection of fork #3 having a larger object tree (i.e. also including object #4).

At step 3, a second logical fork core object is created (assigned FID #20 (the next OID available) and reserving object OIDs up to #39 for its own use) and a core object (assigned OID #21) is created and written in blob #20. Object #21 is added to the collection in the sub-collection of fork #20, and is linked to object #2. The collection state stored in blob #20 reflects that blob #20 belongs to the sub-collection of fork #20, with a tree of objects starting with object #21. The collection state stored in blob #20 also reflects that the last fork object (OType #–5) is fork #20. The fork object #20 indicates that fork #3 is also active at this time. At this point, the collection 80 includes three sub-collections (the sub-collection of the original collection, the sub-collection of fork #3 and the sub-collection of fork #20), all sharing objects #1 and #2, but otherwise having different object heads and trees.

At step 4, fork #3 evolves parallel to fork #20. Two core objects 50 are created (assigned OID #5 and #6). Object #6 is linked to objects #4 and #5, and is flagged as the last object of its Otype (type #1). This creates a tree of objects in fork #3 with object #6 as the head (i.e. the last object). At step 4, fork #3 is closed by the writing of a Fork Close Object (assigned FID #7), referring to fork #3. Blob #5 is written under fork #3, reflecting the latest state of the fork and its objects.

At step 5, fork #20 evolves parallel to fork #3. Three core objects 50 are created (assigned OID #22, #23 and #24) and written in blob #22. Object #24 is linked to objects #21 and #23. Object #24 is flagged as the last object of its Otype (type #1). Object #23 is linked to object #22. This creates a tree of objects in fork #20 with object #24 as the head (i.e. the last object). At step 5, fork #20 is closed by the writing of a Fork Close Object (assigned FID #25), referring to fork #20 and also written in blob #22. Blob #22 is written under fork #20, reflecting the latest state of the fork and its objects.

At step 6, the sub-collection of logical fork #3 is joined back into the base collection by creating a Master Fork core object (assigned FID #40 (the next OID available, after the last OID reserved to fork #20)) and written in blob #40. The join is performed by updating the collection state to reflect the state of the sub-collection of fork #3, thereby automatically integrating all objects from the object tree of the sub-collection of fork #3 into the main collection. The Master Fork object #40 identifies the fork that was joined (FID #3), other forks that are still active at this time (FID #20), and the master fork (FID #40).

Since the master fork (FID #40) and the fork object #20 reflect different evolutions of the collection 80, the content of these two forks cannot simply be joined (as was done with fork #3). Therefore, to integrate the evolution of both forks into a single fork, the two forks must be merged. Hence, at step 7, a new logical fork is created (assigned FID #41 and reserving objects OIDs up to #50 for its own use), with the intent to merge forks #20 and #40. A core object 50 is created (assigned OID #42). Object #42 replaces object #5 of the master fork #40 and deletes object #21 of fork #20. An additional core object 50 is created (assigned OID #43) and links to objects belonging to three object trees: 1) to newly created object #42 of the merge fork #41; 2) to object #4 of the master fork #40 (and consequently to the chain of objects #4→#2→#1 from the master fork #40); and 3) to object #23 of fork #20. Object 43 is now the new head object of Otype #1 of the merge fork #41. At step 7, fork #41 is finally closed by the writing of a Fork Close core object (assigned FID #44), referring to fork #41, and written in blob #41. Blob #41 is written under fork #40, and the collection state reflects a tree of objects that merges all elements from forks #20 and #40.

Given that the merge fork #40 now represents the state of the collection with all other forks merged into one fork (fork #41), the sub-collection of logical fork #41 is joined back into the base collection with a Fork Base Join core object (assigned FID #51 (the next OID available)). The join is performed by updating the collection state to reflect the state of the sub-collection of fork #41, thereby automatically integrating all objects from the object tree of the sub-collection of fork #41 into the main collection (FID #0). Because the join is done on the base collection, blob #51 also belongs to the base collection and has a FID #0. At this point, the collection is considered as having no forks and works like any other standard collection.

Figure 7C:
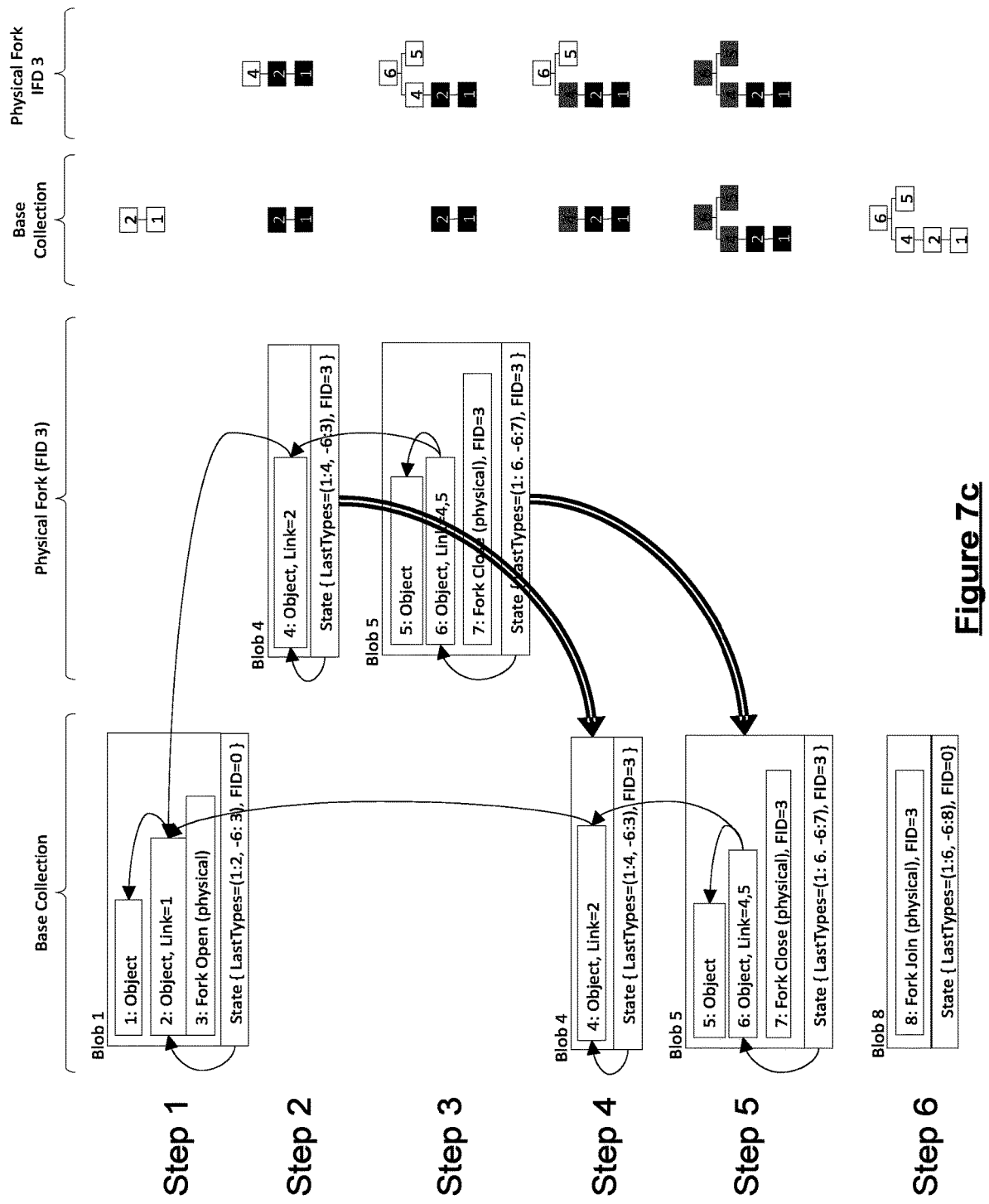

Referring to FIG. 7c, an example of forking of a collection in accordance with an embodiment where a physical fork is opened, updated, and subsequently joined back to the base collection is described. Once again, in the example of FIG. 7c, the evolution of the collection 80 and sub-collections is followed blob 60 by blob 60. In the example of FIG. 7c, there are two object types for the core objects of the collection: Otype #1 for regular core objects, and Otype #−6 representing Physical Fork core objects.

At step 1, two core objects 50 are created (assigned OID #1 and #2) and are written in blob #1. The object tree with objects #1 and #2 is reflected in the state of the collection stored in blob #1, with object #2 as last object of Otype #1. In addition, a Physical Fork core object is created (assigned FID #3). The last object for each Otype (OID #2 for Otype #1, and OID #3 for Otype #−6) are recorded in the collection state in blob #3. Given that blob #1 belongs to the base collection at this point, it is written with a FID #0.

A new backend is assigned to save all the blobs 60 of the new physical fork (fork #3). It will be understood that any backend type and/or configuration can be used for saving the blobs associated to the new physical fork. In an embodiment, the backend can even be a temporary memory-based fork.

At step 2, a core object (assigned OID #4) is created and written in blob #4. Object #4 is added to the collection with a FID #3 and the physical fork (fork #3) now represents a chain of objects, with OID #4 as the head, stored in the physical fork, and chained to OID's #2 and #1 stored in the base collection. The collection state stored in blob #3 reflects that blob #3 belongs to the sub-collection of fork #3 (FID #3), with a tree of objects starting with object #4. At this point, the collection 80 includes two sub-collections (the sub-collection of the original collection and the sub-collection of fork #3), both sharing objects #1 and #2, but with the sub-collection of fork #3 having a larger object tree (i.e. also including object #4). It will be understood that the physical fork (fork #3) does not affect the base collection, which still includes an object tree with OID #2 as the head.

At step 3, two new core objects 50 (assigned OID #5 and #6) are created in the sub-collection of the fork #3, and are stored in blob #5. Object #6 is linked to objects #4 and #5, and is flagged as the last object of its Otype (type #1). This creates a tree of objects with object #6 as the head (i.e. the last object) still sharing objects #1 and #2 with the sub-collection corresponding to the base collection. At step 3, fork #3 is closed by the creation of a Fork Close Object (assigned FID #7), referring to fork #3 and written to blob #5. Blob #5 is written under fork #3, reflecting the latest state of the fork and its objects. Now that fork #3 is marked as closed, no other core objects can be written in this physical fork, thereby ensuring that the fork won't be updated afterwards.

In the example of FIG. 7c, given that the base collection has not been updated since the physical fork (Fork #3) was created, the changes made in the physical fork can be reintegrated back into the main collection with a simple join. In the embodiment shown, this is accomplished in steps 4 and 5 by copying the blobs associated to the physical fork (fork #3) back into the main collection backend. In an alternative embodiment (not shown), reintegration of the changes made in the physical fork into the main collection could also be achieved by reconfiguring the backend of the physical fork (fork #3) as being part of the main collection. Such a reconfiguration would achieve the same thing as recopying the blobs associated to the physical fork (fork #3) back into the main collection backend, without blob movement.

Finally, at step 6, a Fork Join Core Object is created (assigned FID #8) and written in blob #8, in the main collection. The creation of the Fork Join Core Object in the base collection ensures that future blobs will be written with a FID #0 (the FID of the main collection).

Figure 7D:
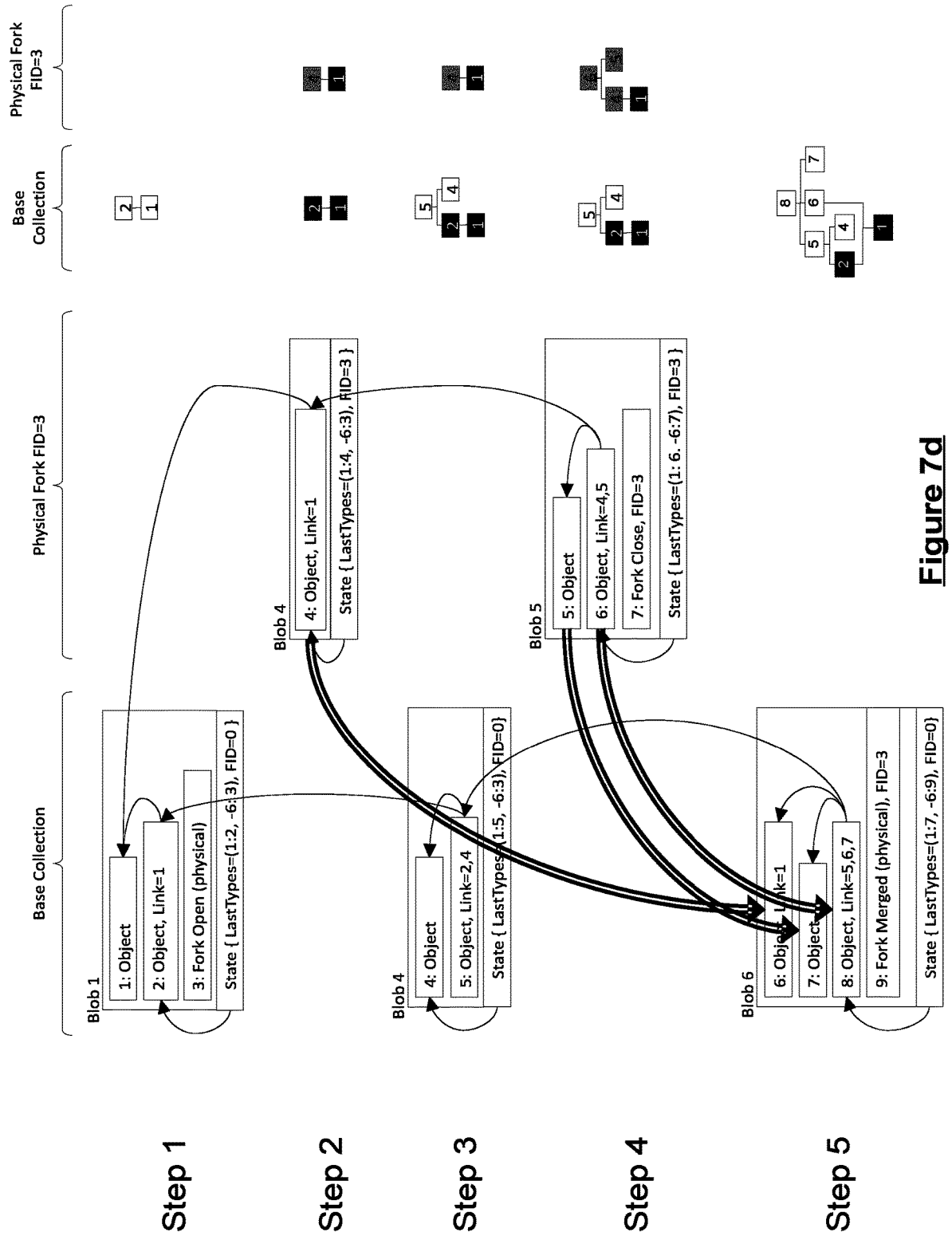

Referring to FIG. 7d, an example of forking of a collection in accordance with an embodiment where a physical fork is opened, updated simultaneously with the base collection, and subsequently merged back with the base collection. Once again, in the example of FIG. 7d, the evolution of the collection 80 and sub-collections is followed blob 60 by blob 60. In the example of FIG. 7d, there are two object types for the core objects of the collection: Otype #1 for regular core objects, and Otype #−6 representing Physical Fork core objects.

At step 1, two core objects 50 are created (assigned OID #1 and #2) and are written in blob #1. Object #2 links to object #1 and is flagged as the last object of Otype #1. The object tree with objects #1 and #2 is reflected in the state of the collection stored in blob #1, with object #2 as last object of Otype #1. In addition, a physical Fork core object is created (assigned FID #3). The last object for each Otype (OID #2 for Otype #1, and OID #3 for Otype #−6) are recorded in the collection state in blob #3. Given that blob #1 belongs to the base collection at this point, it is written with a FID #0.

Once again, a new backend is assigned to save all the blobs 60 of the new physical fork (fork #3). As stated above, it will be understood that any backend type and/or configuration can be used for saving the blobs associated to the new physical fork.

At step 2, a core object (assigned OID #4) is created and written in blob #4. Object #4 is added to the collection with a FID #3 and the physical fork (fork #3) now represents a chain of objects, with OID #4 as the head, stored in the physical fork, and chained to OID #1 stored in the base collection. The collection state stored in blob #3 reflects that blob #3 belongs to the sub-collection of fork #3 (FID #3), with a tree of objects starting with object #4. At this point, the collection 80 includes two sub-collections (the sub-collection of the original collection and the sub-collection of fork #3). The sub-collection of fork #3 has an object tree including object #4 linked to object #1). It will be understood that the physical fork (fork #3) does not affect the base collection, which still includes an object tree with OID #2 as the head.

At step 3, two core objects are created in the base collection (assigned OID #4 and #5) and written in blob #4 of the base collection. It will be understood that, the newly created core objects and blobs are different than those in the physical fork (fork #3), given that the physical fork and the base collection now have completely diverged (i.e. operating similarly as different collections). The base collection now has a tree of core objects with OID #5, and OID #4 being different than the core object having object OID #4 in the physical fork (fork #3). The two forks (i.e. the physical fork and the fork of the base collection), have different FIDs and use different backends and therefore are isolated from one another, while still sharing common core object #1 that existed before the collection was forked.

At step 4, two core objects are created in the physical fork (assigned OID #5 and #6) and written in blob #5 of the physical fork (i.e. with FID #3). Once again it must be understood that object #5 of physical fork #3 is different than object #5 of the base collection. Object #6 of fork #3 is linked to objects #4 and #5, and is flagged as the last object of its Otype (type #1). At step 4, fork #3 is closed by the writing of a Fork Close Object (assigned FID #7), referring to fork #3, and written in blob #5. Blob #5 is written under fork #3, reflecting the latest state of the fork and its objects. The collection state in blob #5 reflects object OID #6 (Otype #1) and the fork close object #7 (Otype #−6) as last objects of their Otypes. Now that fork #3 is marked as closed, no other core objects may be written in this physical fork, thereby ensuring that the fork won't be updated afterwards.

Since the base collection and the physical fork (fork #3) were updated at the same time, the forks cannot simply be joined; to reintegrate changes made in the physical fork back into the base collection, the forks need to be merged. At step 5, the base collection and the physical fork (fork #3) are merged using a helper (not shown). The helper reconstructs the payload of the core objects of the physical fork (fork #3) (i.e. core objects #4, #5 and #6) in the base collection in newly created core objects. In the embodiment shown, core object #4 of fork #3 is recreated under core object #6 of the base collection, core object #5 of fork #3 is recreated under core object #7 of the base collection, and core object #6 of fork #3 is recreated under core object #8 of the base collection, with each newly created core object being linked to corresponding existing objects of the base collection or being replaced/deleted, as necessary. After the merge, object #1 has two parents (Object #2 and object #6). This is a valid construct and there are no theoretical limits to the number of links an object can be the child of. A physical Fork Merge (assigned FID #9) is written in the base collection to record the fact that the physical fork #3 was merged into the base collection and is no longer used. The blobs including all merged core objects are written under FID #0, as those blobs now belong to the base collection.

In an embodiment (not shown), where the merge is complex and involves many blobs, a logical fork can be initially created in the main collection and used to record the merging process before being joined back to the main collection. The use of a logical fork helps to prevent the merge operation from affecting the main collection's view of objects until all updates are integrated.

In view of the above, the combination of immutability and unique OIDs 52a of the core objects 50 with BIDs 61a being derivative of the OIDs 52a of the core objects 50 it contains, allow the blobs 60 to be highly stable, autonomous and freely mobile data containers that need no central control, tracking, indices or maps.

Because core objects 50 are themselves immutable and OIDs 52a are permanently unique, blobs 60 are by extension essentially immutable. Hence, given that the core objects 50 in a blob 60 cannot change, either by content or by OID 52a, there is no need to define or store which "version" of a blob 60 copied or replicated to another location contains the latest version of a given core object 50; all blobs 60 with a given BID 61a are equivalent.

Because BIDs 61a are derived from the OIDs 52a of the core objects 50 of the blob 60, it can be determined which blob 60 contains a given core object 50 using only the OID 52a of the sought core object 50, thereby removing the burden of having to maintain indices or maps as to which blobs 60 contain which core objects 50.

Because the BID 61a conveys not only the identity of the blob 60, but also, by extension, the identity, state and contents of all objects 50 within the blob 60, this prevents the need to share information regarding the content of a blob 60 with the backends 70 and allows the entire blob to be encrypted and totally hidden, including any control information or other metadata. Because blobs 60 are totally sealed, encrypted containers of data, they can be securely copied by any mechanism or agent without them needing to know anything about the contents or nature of the blob 60. Hence, backends 70 can move and copy blobs freely from one backend to another without understanding or confirming the contents of a blob 60 (or checking with a central authority to understand what they contain), even if infrastructures of the backends 70 are different. The only things that need to be exchanged are BIDs 61a and the content of blobs 60.

Finally, because BIDs 61a are derived from the OIDs 52a of the sought core objects 50 and can be located using a short list of BIDs 61a held by storage backends 70, the exact location of the core objects 50 is automatically disclosed in real-time through BID derivation. No tracking or indexing of the blobs 60 is required. This allows free movement or scattering of the blobs 60 between backends 70, without notification to a central unit. The storage backends 70 are the only components required to know which blobs 60 they contain. As long as a blob 60 with a given BID 61a is available somewhere, the data is readily available. Moreover, blobs 60 can be freely replicated to any storage medium or service, without central coordination, to increase the availability and integrity of the data. Any copy of a blob, wherever it is located, can be used.

In view of the above, the described structure also allows collections 80 to be shared between users in peer-to-peer mode, without requiring the use of a central coordination unit such as a central server or the like, even for updates. Collection sharing is possible in view of the structure of the blobs 60 and log-structured core objects 50, by application of collision Integrity principles. For example, in an embodiment where peer to peer sharing of a collection is performed between two or more users, if the two or more users attempt to add objects and write to the same blob 60 at the same time, a collision is detected and only one of the user will succeed in writing the blob 60, the others failing as a result of the collision. Such failure of the writing of the blob 60 implies that the collection 80 has been updated. Hence, each of the users for which the writing of the blob failed needs to refresh its view of the collection with the new state of the collection and reconstruct the objects under a new blob 60. Subsequently, it can then resubmit the update in the new blob (written under a new BID 61a). Of course, if a collision is detected again, the process is repeated until it succeeds for the precise user. In alternative embodiments, additional mechanisms can be used, in connection with collision Integrity principles, or separately, in order to limit or alleviate the occurrence of collisions. For example and without being limitative, logical forks can be used for each user to reduce the risks and frequency of collisions. One skilled in the art will recognize that, for collision detection to work, possibly colliding blobs must be stored in the same backend shared by all users. However, blobs associated to physical forks or reserved OID ranges in logical forks, which cannot collide, may be stored in any backend not necessarily used or shared by all users. One skilled in the art will also recognize that, in an embodiment, a lock server could be used instead of collision detection, in order to ensure sharing integrity. In another alternative embodiment, peer-to-peer sharing can also be done without using any shared common backends 70 nor relying on collision detection. This is known as detached backends sharing where the collection is simply configured so that each user has its own physical backends 70 with a private copy of the blobs 60 and can therefore read and update their own copy of the collection 80 separately. When clients reconnect, their detached collections can be joined/merged as if they were physical forks in order to reintegrate changes that were performed while they were detached.

The method for performing data storage 10 having been described above, a system 100 for performing the above described distributed data storage will now be described.

Figure 8:
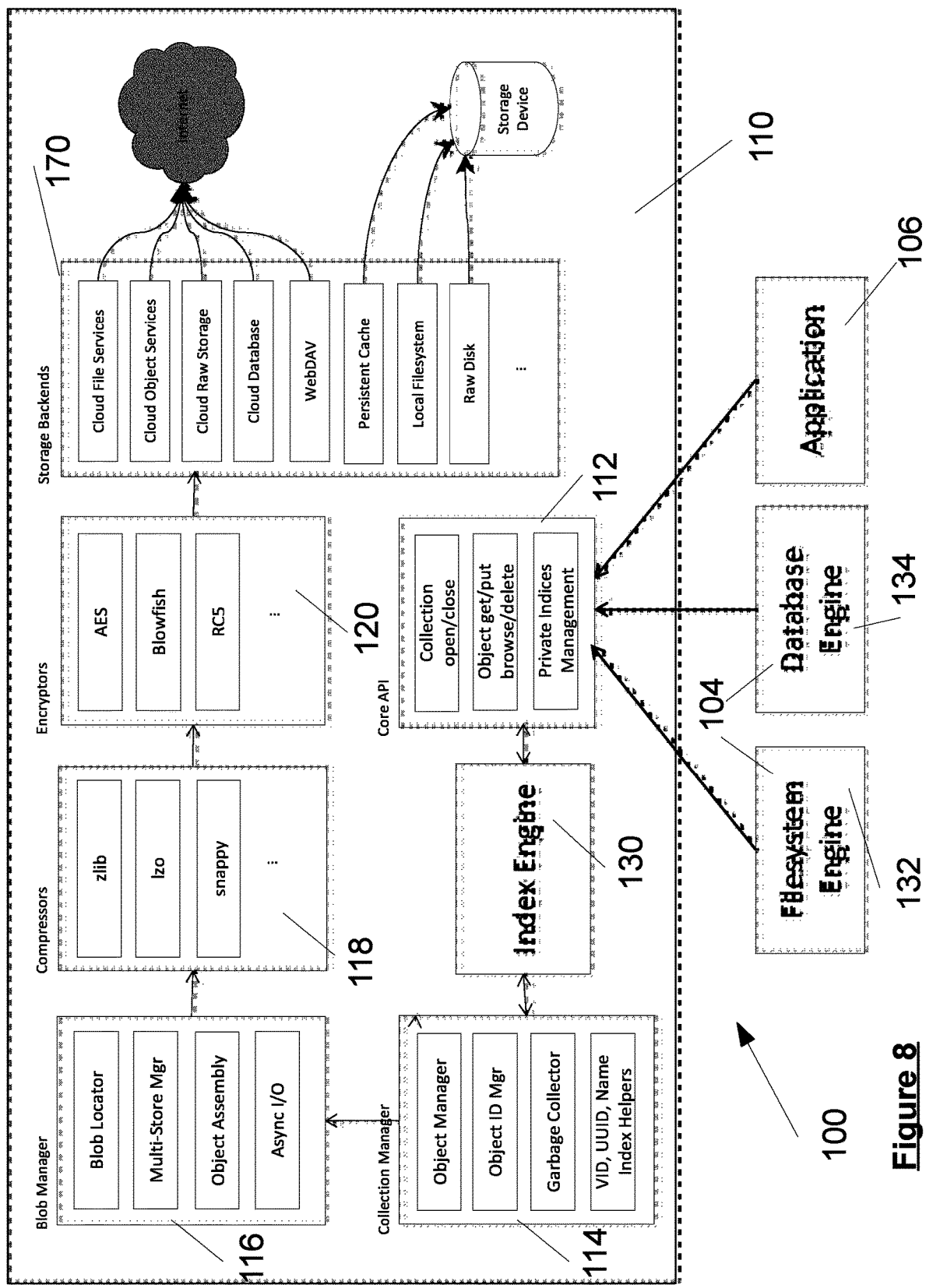
FIG. 8 is a schematic representation of a system for performing data storage, in accordance with an embodiment.
Figure 9:
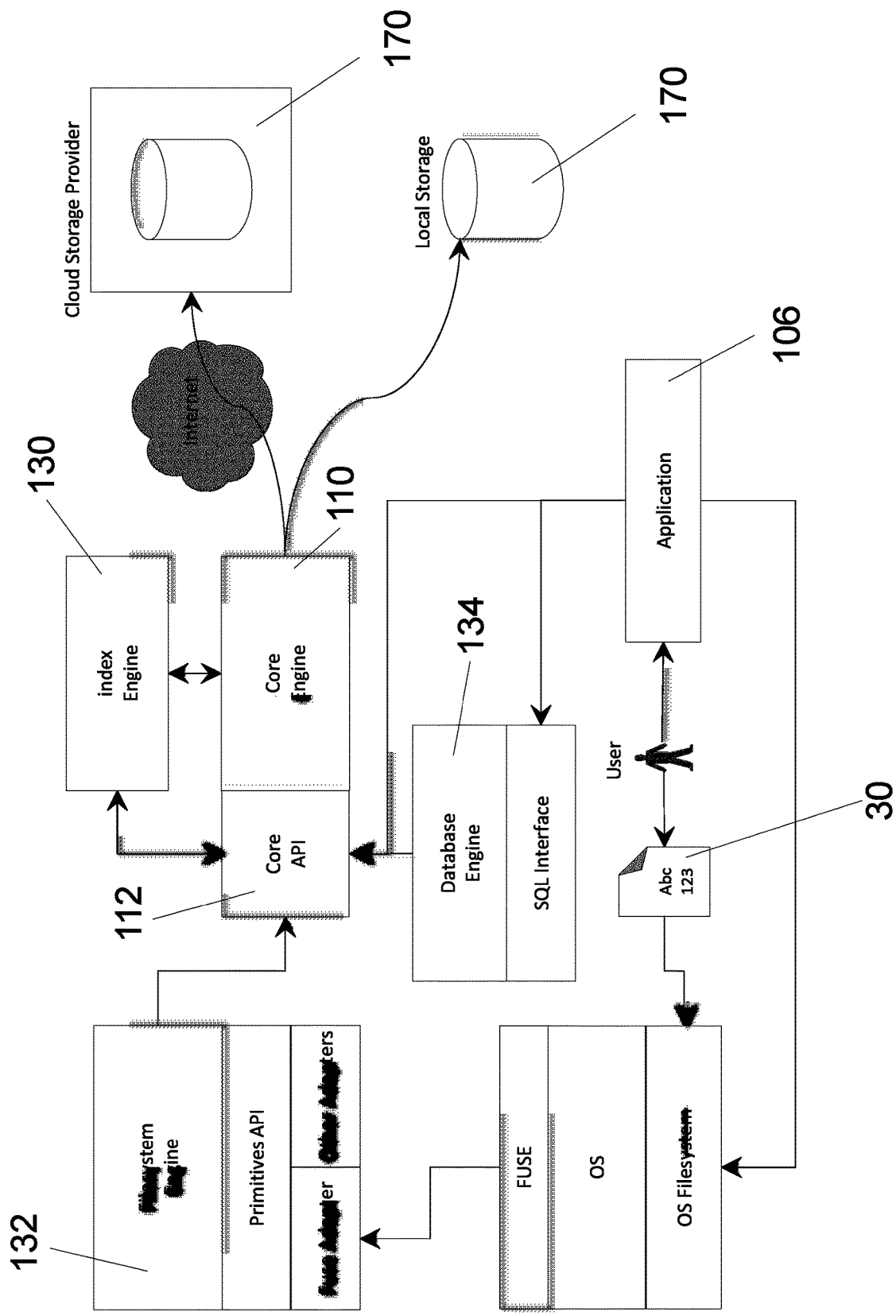
FIG. 9 is a schematic representation of the system for performing data storage of FIG. 8, in accordance with an embodiment where an application uses a filesystem engine module and/or a database engine module for communicating with the core engine module.

With reference to FIGS. 8 and 9, in an embodiment, the system 100 includes a core engine module 110 in data communication with data sources such as engine modules 104 (such as a filesystem engine module 132, a database engine module 134, an index engine module 130 or the like) and/or applications 106, requesting data storage. In general terms, the core engine module 110 is the engine providing the basic services under which all other services rely upon in order to perform the distributed data storage. In other words, the core engine module 110 is the main module of the system 100 which manages the creation, update, deletion of the objects, blobs, collections and backends from the collection, performs blob compression/decompression (if required), performs blob encryption/decryption (if required), performs collection management, and the like.

The core engine module 110, engines modules 104, and/or applications 106 and/or sub-components thereof can be part of a local computing system (i.e. where each component/sub-component is installed on the same computing unit having its own memory and processor). One skilled in the art will however understand that, in an embodiment, the core engine module 110, engines 104 and/or applications 106 and/or sub-components thereof can be distributed on separate computing unit in data communications with one another, for example over a network.

In an embodiment, the core engine module 110 includes a core Application Programming Interface (API) module 112 through which additional engine modules 104 and applications 106 can request storage services. Applications 106 are external programs which use the system 100 to store data. In an embodiment, applications 106 use the core engine API module 112 to structure their data as discrete objects. In alternative embodiments (see FIG. 9), the applications 106 can also use the database engine module 134, which will be described in more details below, to store its data as table records, or use the filesystem engine module 132, which will also be described in more details below, directly or indirectly, to work with files. In an embodiment, the core API module 112 is operative to open collections, read, write and delete core objects and the like.

In an embodiment, the core engine module 110 also includes a collection manager module 114 in communication with the core API module 112. The collection manager module 114 handles all high-level requests and manages the core objects. For example, the collection manager module 114 assigns compliant OIDs to created objects and, in an embodiment, assigns appropriate object identification information (such as alias, VID, or the like) to the objects, as discussed above. The collection manager module 114 also includes the garbage collector operative to identify and purge obsolete objects, i.e. objects which are unreferenced and are purgeable according to the defined purge parameters, as discussed above in relation to the corresponding method.

The collection manager module 114 communicates with a blob manager module 116 for generating and managing blobs. The blob manager module 116 generates blobs (i.e. assemble objects into blobs) and assigns BID, locates blobs, coordinates access to multiple backends, and implements asynchronous inputs/outputs (I/Os) with the backends.

The collection manager module 114 and blob manager module 116 implement the above described central features of the objects and blob, namely the object immutability, permanently unique object IDs (OIDs), derived blob IDs (BIDs) and predictable BIDs, which allow the capacity to subsequently freely store, move, copy and scatter data from one backend 170 (or storage location) to another without using indices, central control, tracking or synchronization and to share that data in peer-to-peer mode with updates without using locks or a central coordination server.

The blob manager module 116 in turn communicates with an independent compressor module 118 to compress and decompress the contents of the blobs. In an embodiment, the compressor module 118 can implement multiple compression algorithms (it can use different compression algorithms for different blobs) and encapsulates each blob with a compression tag to identify the compression algorithm used for subsequent decompression when a blob is read back for decompression thereof. One skilled in the art will understand that, in an embodiment where no compression is applied to the blobs, the core engine module 110 can be free of compressor module 118.

The core engine module 110 also includes an encryptor module 120 communicating with the compressor module 118. Similarly to the compressor module 118, the encryptor module 120 can implement a plurality of encryption algorithms and can therefore apply different encryptions to different blobs, thereby enhancing security of the overall system 100. The encryptor module 120 can also encapsulate the blobs with an encryption tag indicating how each specific blob can be decrypted when read back from the backends. Once again, one skilled in the art will understand that, in an embodiment where no encryption is applied to the blobs, the core engine module 110 can be free of encryptor module 120.

In the embodiment shown, the encryptor module 120 is in data communication with the backends 170. As mentioned above, multiple backends can be associated to each collection and the blobs can be autonomously distributed and/or scattered across multiple backends for storage thereof, in order to perform distributed data storage of the stored data. In an embodiment where the core engine module 110 is free of encryptor module 120 and/or compressor module 118, the backends 170 can be in data communication directly with the blob manager module 116.

In the embodiment shown, the compressor module 118, encryptor module 120 and backends 170 work as stream handlers, freely passing data between themselves to read and write blobs. As will be easily understood, at the end of the stream, backends 170 are where the blobs are actually physically stored, in the cloud and/or on local physical storage devices.

Still referring to FIGS. 8 and 9, in an embodiment, the system 100 includes additional engine modules such as the index engine module 130, filesystem engine module 132 and database engine module 134, which will be described in more details below. The index engine module 130, filesystem engine module 132 and database engine module 134 are operative to provide file and database services to users, operating systems and applications.

The index engine module 130 provides indexing services to other engine modules such as the filesystem engine module 132 and database engine module 134 and to applications 106, such that data stored in a collection can be easily organized and located. In other words, the index engine module 130 stores key/value pairs in order to allow values to be efficiently stored and retrieved by key. For example and without being limitative, in an embodiment, for the index engine module 130, indices (i.e. simple, general-purpose dictionaries consisting of binary key/value pairs) can be saved as regular core engine objects, linked together by OIDs, with a head object holding the tree of all objects for a given index. In an embodiment, indices are stored internally as log-structured B+Trees, but one skilled in the art will understand that, in alternative embodiments, other data structure allowing high speed searches, sequential access, insertions, and deletions could also be used to store indices. For example and without being limitative, in an embodiment, the index engine module 130 is used, amongst others, by the core engine module 110 to manage object aliases and Virtual IDs for the objects thereof. The index engine module 130 can also be used to maintain private indices which can contain any form of key/value pairs. For example and without being limitative, in an embodiment, the private indices can be used by engine modules (such as the filesystem engine module 132 and database engine module 134, which will be described in more details below) for efficiently managing key/value pairs, for example to hold a dynamic dictionary, a list of named items, or the like.

The filesystem engine module 132 implements file storage using the above described structure of objects and blobs. In an embodiment, the filesystem engine module 132 is in data communication with the core engine module 110 and includes APIs through which well-known filesystem primitives such as readdir, open, read/write and close can be used by applications, user computing device or the like, to store and retrieve files, directories, metadata and associated structures. For example and without being limitative, in an embodiment, the filesystem engine module 132 can be connected directly to an operating system interface (e.g. FUSE), to allow the storage of files by users as if they were local files. The filesystem engine module 132, therefore allows users to store and securely scatter their files on multiple backends, such as cloud storage providers or other mediums without central coordination, using the core engine module 110. In view of the above, one skilled in the art will understand that, in an embodiment where the backend 170 of the core engine module 110 is a physical disk or other local storage media, the system 100 can be used directly as a true, end-to-end, filesystem for the user's computing device, with all the features and advantages of the distributed storage facilities provided by the system 100.

The database engine module 134 provides database services to applications through published interfaces (e.g. SQL, CLI, ODBC, etc.), and stores the corresponding structures (e.g. schemas, fields, indices, records, etc.) as core objects and index engine private indices. Therefore, the database engine module 134 collaborates with the index engine module 130 and the core engine module 110 in order to perform data storage for databases. The use of the index engine module 130 and the core engine module 110 of the present system 100 allows databases to be fully distributed and scattered on different backends 170 such as, multiple cloud storage providers, shared storage systems and local media, with all the benefits of the above-described system 100.

The above described method and system for distributed storing of data allows to freely store, move, copy and scatter data from one storage location (cloud storage provider, network disk, local media, etc.) to another without using indices, central control, tracking or synchronization, and to share that data in peer-to-peer mode with updates without using locks or a central coordination server. Such characteristics allows data to be simultaneously stored on local disks and cloud storage, updated in real-time, moved or copied from one medium to another without notification to a central system, and have the core engine automatically locate and retrieve the required information at any time with high integrity.

Several alternative embodiments and examples have been described and illustrated herein. The embodiments of the invention described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while specific embodiments have been illustrated and described, numerous modifications come to mind without significantly departing from the scope of the invention as defined in the appended claims.

The invention claimed is:

1. A computer-implemented method for performing data storage, the method comprising the steps of:
   receiving data to be stored from a data source;
   segmenting the data into immutable core objects, each one of the core objects being written into a collection and being assigned a unique object ID;
   grouping the immutable objects into blobs each including at least one of the objects, each one of the blobs being assigned a unique blob ID derived from the object ID of the at least one of the objects included therein, with the last blob of the collection being identifiable as such;
   defining a state of the collection by linking at least one subset of the core objects of the collection to one another with a last object of each one of the at least one subset being the object head of the corresponding subset and storing identification information of the head object; and
   storing each one of the blobs onto at least one backend.

2. The method of claim 1, wherein the step of storing identification information of the head object comprises storing identification information of the head object in the last blob of the collection.

3. The method of claim 1, further comprising the step of selectively retrieving corresponding blobs from one of the at least one backend upon request of the stored data.

4. The method of claim 3, further comprising the steps of encrypting the blobs prior to the step of storing the blobs onto the at least one backend and decrypting the blobs subsequently to the step of retrieving corresponding blobs from one of the at least one backend, the method further comprising the steps of compressing the blobs prior to the step of encrypting the blobs and decompressing the blobs subsequently to the step of decrypting the blobs.

5. The method of claim 1, wherein each one of the core objects has an object type and wherein the step of maintaining the state of the collection by linking at least one subset of the core objects of the collection to one another, with the last object of each one of the at least one subset being the object head, comprises linking active objects of each object type with the last object of each object type being the head object for the corresponding object type.

6. The method of claim 1, wherein the step of storing each one of the blobs onto at least one backend includes storing the blobs onto distributed backends.

7. The method of claim 1, further comprising the step of encrypting the blobs prior to the step of storing the blobs onto the at least one backend and compressing the blobs prior to the step of encrypting the blobs.

8. The method of claim 1, further comprising a step of forking the collection by introducing multiple last blobs being identifiable as the last blob of each forked collection.

9. The method of claim 8, further comprising the step of merging the forked collection into one of a collection and another fork of a collection.

10. A computer readable memory having recorded thereon statements and instructions for execution by a computer to carry out the method of claim 1.

11. A data storage system comprising:
a core engine module configured to receive data to be stored, store the data onto at least one backend, and retrieve the data from the at least one backend; the core engine module generating and managing at least one collection comprising:
core objects each including data to be stored, each one of the objects being immutable and being assigned a unique object ID and wherein at least one subset of the core objects are linked to one another with a last object of each one of the at least one subset being the object head of the corresponding subset;
blobs each including at least one of the objects, each one of the blobs being assigned a unique blob ID derived from the object ID of the at least one of the objects included, the last blob of the collection being identifiable as such and including identification information of the head object of each one of the at least one subset; and
the at least one of backend storing the blobs thereon and allowing the blobs to be retrieved using the corresponding blob ID.

12. The data storage system of claim 11, wherein the core engine module comprises a core API module configured to open collections and read, write and delete core objects, a collection manager module configured to generate and manage the core objects, and a blob manager module configured to generate and manage the blobs.

13. The data storage system of claim 12, wherein the core engine module further comprises an encryptor module encrypting the blobs prior to storage onto the at least one backends and decrypting the blobs subsequently to retrieval from the at least one backends.

14. The data storage system of claim 13, wherein the core engine module further comprises a compressor module compressing the blobs prior to encryption by the encryptor module and decompressing the blobs subsequently to decryption by the encryptor module.

15. The data storage system of claim 11, wherein link data representative of the links between the core objects of each one of the at least one subset of the core objects is stored in at least a portion of the core objects.

16. The data storage system of claim 11, wherein the unique object ID of each one of the core objects is assigned sequentially.

17. The data storage system of claim 16, wherein the unique blob ID of each one of the blobs corresponds to the object ID of the first core object of the blob.

18. The data storage system of claim 11, wherein each one of the core objects further comprises one of an object alias and a virtual object ID.

19. The data storage system of claim 11, further comprising an index engine performing indexing services to facilitate the organization and location of data stored in a collection.

20. The data storage system of claim 11, wherein the at least one backend of each collection comprises multiple distributed backends to provide distributed storage of the blobs.

* * * * *